United States Patent
Mikami et al.

(10) Patent No.: US 8,863,154 B2
(45) Date of Patent: Oct. 14, 2014

(54) MONITORING SYSTEM AND MONITORING PROGRAM

(75) Inventors: Atsushi Mikami, Yokohama (JP); Takaki Kuroda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/581,535

(22) PCT Filed: Feb. 27, 2012

(86) PCT No.: PCT/JP2012/054794
§ 371 (c)(1),
(2), (4) Date: Aug. 28, 2012

(87) PCT Pub. No.: WO2013/128550
PCT Pub. Date: Sep. 6, 2013

(65) Prior Publication Data
US 2013/0227589 A1    Aug. 29, 2013

(51) Int. Cl.
G06F 3/00     (2006.01)
G06F 9/44     (2006.01)
G06F 9/46     (2006.01)
G06F 13/00    (2006.01)

(52) U.S. Cl.
USPC ........................................................ 719/318

(58) Field of Classification Search
None
See application file for complete search history.

(56) References Cited

U.S. PATENT DOCUMENTS

| 2002/0032764 | A1* | 3/2002 | Ishikawa et al. ............... 709/223 |
| 2005/0172162 | A1 | 8/2005 | Takahashi et al. |
| 2009/0313198 | A1 | 12/2009 | Kudo et al. |
| 2012/0017127 | A1 | 1/2012 | Nagai et al. |

FOREIGN PATENT DOCUMENTS

| JP | 01-214998 A | 8/1989 |
| JP | 02-259906 A | 10/1990 |
| JP | 03-042725 A | 2/1991 |
| JP | 10-187232 A | 7/1998 |
| JP | 01-214998 A | 8/1998 |
| JP | 2012-22614 A | 2/2012 |
| WO | 2004/061681 A1 | 7/2004 |

OTHER PUBLICATIONS

International Searching Authority, Written Opinion received in PCT Application PCT/JP2012/054794, Apr. 17, 2012, with Partial English Translation.

* cited by examiner

Primary Examiner — H S Sough
Assistant Examiner — William C Wood
(74) Attorney, Agent, or Firm — Mattingly & Malur, PC

(57) ABSTRACT

A monitoring system performs cause analysis of an event occurring in any of a plurality of monitoring-target objects to be monitored based on a rule. In this case, the monitoring system makes a detection during the analysis time width and determines a plurality of conclusions based on an event corresponding to the condition for determining the conclusion. Moreover, the monitoring system performs one or more of (A) displaying change of certainty to be used for determination of a conclusion in a case where the analysis time width is assumed to be changed, (B) performing sort display of the determined conclusion based on an index value showing an affected range and (C) calculating the analysis time width based on the index value.

15 Claims, 19 Drawing Sheets

EVENT DETECTION PROCESS

SYSTEM CONFIGURATION DIAGRAM

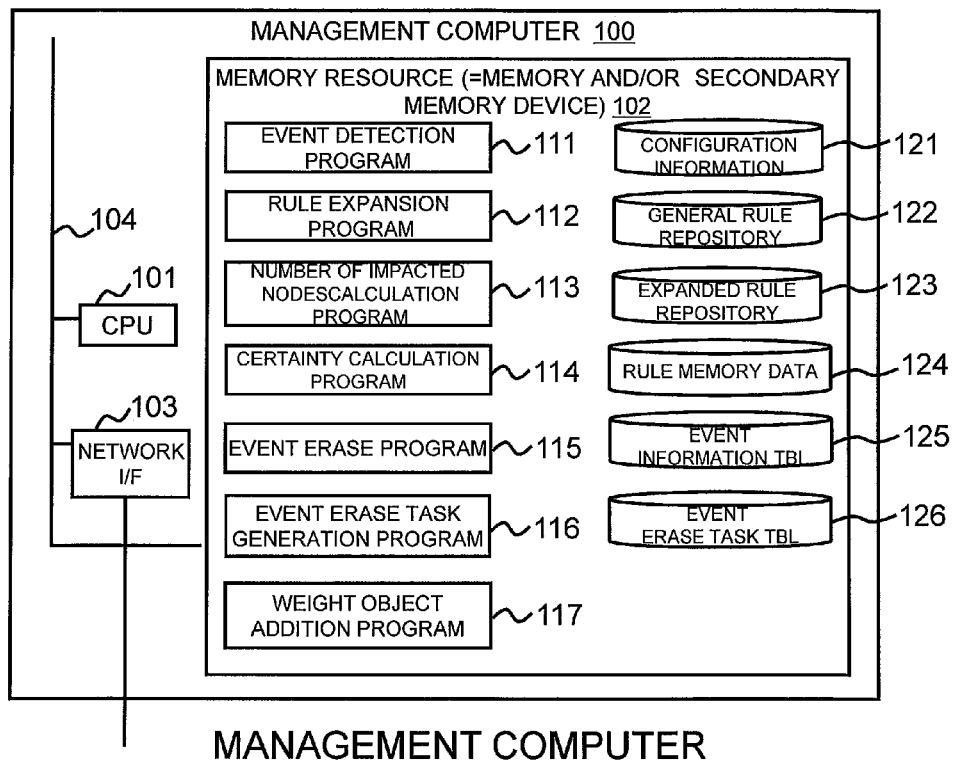
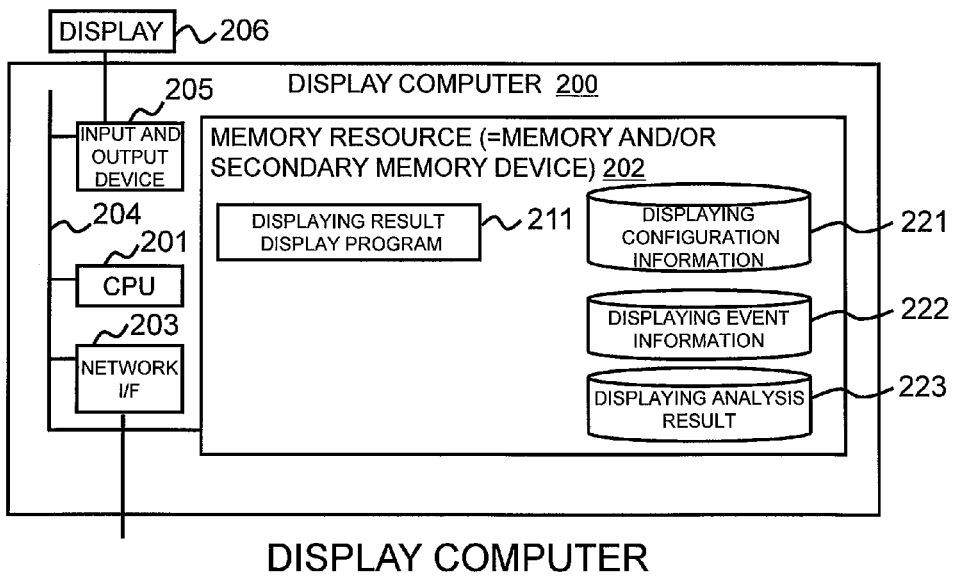

ROUTER MANAGEMENT TABLE 600 iSCSI TARGET MANAGEMENT TABLE 700

EXAMPLE OF GENERAL RULE

EXAMPLE OF EXPANDED RULE

RULE MEMORY DATA 124

EVENT MESSAGE 1100

EVENT INFORMATION TABLE 125

| START TIME | NODE NAME | EVENT TYPE | NUMBER OF IMPACTED NODES | RECEIVING TIME |
|---|---|---|---|---|
| 4/13/2008 9:20:11 | ServerA | Cpu_Pfm_Err | 1 | 4/13/2008 9:10:11 |
| 4/13/2008 9:40:11 | ServerA | iSCSI_Comm_Err | 2 | 4/13/2008 9:30:11 |
| 4/13/2008 9:20:25 | Storage1 | Controller_Err | 2 | 4/13/2008 9:10:25 |
| 4/13/2008 10:00:11 | ServerA | iSCSI_Comm_Err | 4 | 4/13/2008 9:50:11 |
| ... | ... | ... | ... | |

EVENT ERASE TASK TABLE 126

EXAMPLE OF WEIGHT VALUE CHANGE

RULE EXPANSION PROCESS

WEIGHT OBJECT ADDITION PROCESS

NUMBER OF IMPACTED NODES CALCULATION PROCESS

EVENT DETECTION PROCESS

CERTAINTY CALCULATION PROCESS

EVENT ERASE TASK GENERATION PROCESS

EVENT ERASE PROCESS

RELATIONSHIP DIAGRAM OF PROCESSES

FIG. 23

| | Node Name | Impacts | ▲Certainty | Event Detected Nodes | Analysis Time Range |
|---|---|---|---|---|---|
| #1 | Storage1 | 4 | 100% | ServerA, ServerB, ••• | 20 |
| #2 | Storage1 | 4 | 75% | ServerA, ServerB, ••• | 20 |
| #3 | ServerA | 3 | 66% | ServerA, IPSwitch1, ••• | 15 |
| #4 | ServerB | 5 | 60% | ServerB, IPSwitch2, ••• | 25 |
| #5 | IPSwitch2 | 8 | 50% | ServerE, ServerF, ••• | 40 |
| #6 | ServerA | 2 | 50% | ServerA, Storage1 | 10 |
| #7 | ServerB | 1 | 50% | ServerB | 5 |
| #8 | ServerC | 1 | 50% | ServerC | 5 |
| #9 | IPSwitch1 | 3 | 33% | IPSwitch1, Server2, ••• | 15 |
| #10 | Server3 | 3 | 33% | Server3, Storage2, ••• | 15 |

Header: 2008-4-13 9:30 +0900 / RCA Availability Snapshots-2008-4-13 9:30 +0900

2300, 2301, 2302, 2303

THE FIRST ANALYSIS RESULT DISPLAY SCREEN

THE SECOND ANALYSIS RESULT DISPLAY SCREEN

MONITORING SYSTEM AND MONITORING PROGRAM

TECHNICAL FIELD

The present invention relates to a monitoring system and a monitoring program that analyze a root cause of an phenomenon occurring in a monitoring-target object such as a node apparatus and a component to be monitored (hereinafter, it is referred to as "event").

BACKGROUND ART

The technology that analyzes a root cause of an event related to failure or the like in an information processing system having a plurality of apparatuses such as a server, a storage and a network apparatus has been known.

For example, Patent Literature 1 discloses the following technology. That is, a monitoring system disclosed in Patent Literature 1 stores a rule including general condition and conclusion described based on know-how of failure analysis, expands the rule to a system configuration to be monitored, performs a cause analysis based on existence or non-existence of detection of an event shown by the condition of the rule to calculate certainty of the conclusion which can be a cause. The monitoring system assumes the cause based on the calculated certainty and displays its result to inform an administrator.

CITATION LIST

Patent Literature

[Patent Literature 1]
U.S. Patent Application Laid-Open No. 2009/313198

SUMMARY OF INVENTION

Technical Problem

The monitoring system disclosed in Patent Literature 1, in analysis of a root cause, calculates certainty of each conclusion based on information showing association with a plurality of conclusions which can be a cause and one or more conditions showing the event that occurs affected by each conclusion when the conclusion is the cause, and existence or non-existence of detection in a predetermined past time (this time width is referred to "analysis time width") of the event shown by each condition.

Moreover, in displaying an analysis result of a root cause, this monitoring system determines a plurality of cause candidates based on the calculated certainty and displays the determined plurality of cause candidates with their certainty. For example, this monitoring system determines a plurality of cause candidates with descending order of certainty and displays a list of the determined plurality of cause candidates arranged in descending order of certainty. The administrator refers to the displayed analysis result and can specify a root cause among the plurality of cause candidates. However, the monitoring system disclosed in Patent Literature 1 has the following problems (1) and/or (2).

(1) In a case where a certain event (cause event) occurs in an information processing system, an occurring period of a plurality of events affected by the cause event differs respectively as it is affected by, for example, the content of the event and a positional relationship on the information processing system between an apparatus in which the cause event occurs and an apparatus in which each event occur. When the scale of the information processing system becomes larger, the difference of occurring period of the events becomes larger. Accordingly, when the scale of the information processing system is large, in order to absorb the difference of occurring period of the events, a large analysis time width in analysis with some degree needs to be prepared.

However, when the analysis time width is too large, the number of events affecting the analysis, that is, the number of events judged as detected is increased and the possibility of including events having different occurring causes becomes high (that is, the possibility of including a noise becomes high), so that the accuracy of the analysis could be deteriorated.

(2) In a case where specification of a root cause is performed based on an analysis result focusing only on certainty (for example, the above-described list in which cause candidates are arranged in descending order of certainty), there is a risk for the administrator to fail to find an important cause candidate which should be originally noted even though its certainty is not so high.

Solution to Problem

A monitoring system performs cause analysis of the event occurring in any of a plurality of monitoring-target objects based on a rule. In this case, the monitoring system makes a detection during the analysis time width and determines a plurality of conclusions based on an event corresponding to the condition for determining the conclusion. Moreover, the monitoring system performs one or more of (A) displaying change of certainty to be used for determination of a conclusion in a case where the analysis time width is assumed to be changed, (B) performing sort display of the determined conclusion based on an index value showing an affected range and (C) calculating the analysis time width based on the index value.

BRIEF DESCRIPTION OF DRAWINGS

FIG. 1 is a drawing showing a configuration example of an information processing system according to an embodiment.
[FIG. 2]
FIG. 2 is a drawing showing a configuration example of a management computer according to the embodiment.
[FIG. 3]
FIG. 3 is a drawing showing a configuration example of display computer according to the embodiment.
FIG. 4 is a drawing showing a configuration example of a server according to the embodiment.
FIG. 5 is a drawing showing a configuration example of a storage according to the embodiment.
FIG. 6 is a drawing showing an example of a router management table according to the embodiment.
FIG. 7 is a drawing showing an example of an iSCSI target management table according to the embodiment.
FIG. 8 is a drawing showing an example of a general rule according to the embodiment.
FIG. 9 is a drawing showing an example of an expanded rule according to the embodiment.

FIG. 10 is a drawing showing an example of rule memory data according to the embodiment.

FIG. 11 is a drawing showing an example of an event massage according to the embodiment.

FIG. 12 is a drawing showing an example of an event information table according to the embodiment.

FIG. 13 is a drawing showing an example of an event erase task table according to the embodiment.

FIG. 14 is a drawing showing an example of change of a weight value according to the embodiment.

FIG. 15 is a flow chart of a rule expansion process according to the embodiment.

FIG. 16 is a flow chart of a weight object addition process according to the embodiment.

FIG. 17 is a flow chart of a number of impacted node calculation process according to the embodiment.

FIG. 18 is a flow chart of an event detection process according to the embodiment.

FIG. 19 is a flow chart of a certainty calculation process according to the embodiment.

FIG. 20 is a flow chart of an event erase task generation process according to the embodiment.

FIG. 21 is a flow chart of an event erase process according to the embodiment.

FIG. 22 is a drawing showing a relationship of processes performed by the management computer according to the embodiment.

[FIG. 23]

FIG. 23 is a drawing showing an example of the first analysis result display screen according to the embodiment.

FIG. 24 is a drawing showing an example of the second analysis result display screen according to the embodiment.

DESCRIPTION OF EMBODIMENT

Figure 1:
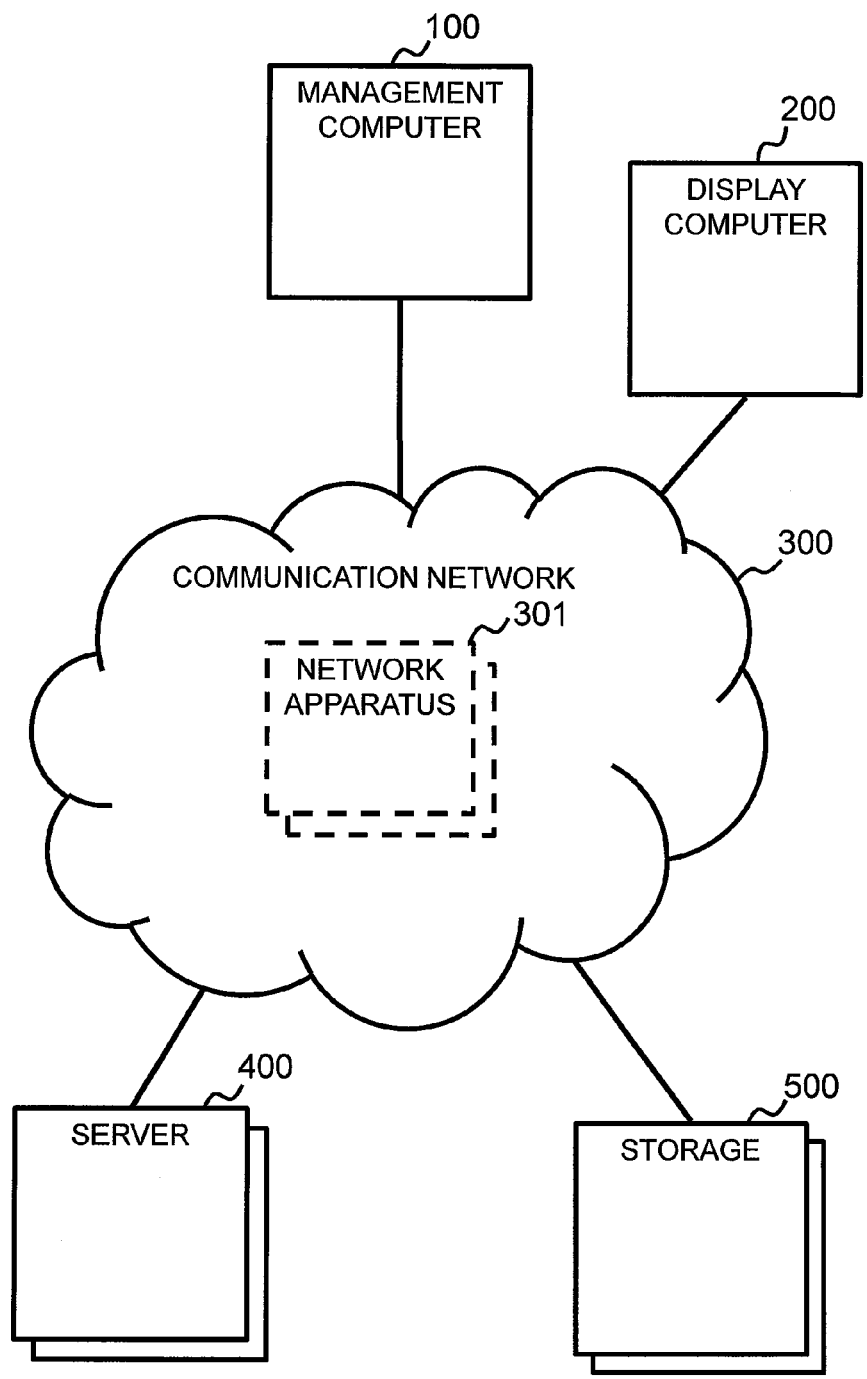
[FIG. 1]

An embodiment will be explained with reference to drawings. Additionally, the embodiment which will be described below does not limit the claimed invention set forth in the claims and not all components explained in the embodiment and combinations thereof are essential to the solution of the invention. In these figures, the same reference symbols show the same components through the plurality of drawings.

Additionally, while the information of the present invention is explained by the expression of "aaa table" in the following explanations, the information may be expressed by data configuration such as a list, DB and a queue. Accordingly, in order to show non-dependence on data configuration, "aaa table" can also be called as "aaa information." Moreover, in explaining the contents of each of the information, expressions such as "identifier," "ID", and "name" are used; however, there terms can be replaced with each other. Additionally, while the term "repository" is used in an explanation of the embodiment, it has the same meaning as "information."

In the following explanation, there is a case where an explanation will be made using "program" as a subject. However, since the program is executed by a processor included in a control device to perform determined processing by using a memory and a communication port (network I/F), the explanation may be made using "processor" as a subject. Also, the process disclosed using the program as a subject may be one executed by a computer or an information processing apparatus such as a management computer. Further, all or a part of the process executed by the processor executing the program may be achieved by an exclusive hardware. Moreover, a various kinds of programs may be installed into each computer by a program-distributed server or a computer-readable storage medium.

Moreover, an act of "displaying" of the control device (and the first computer including the control device) may be any of an act of displaying by the control device a screen part or the like on a display device of a computer including the control device and transmitting display information such as screen components or the like to be displayed on a display device to the second computer including the display device. When the second computer receives the display information, it can display screen components or the like shown by the display information on the display device.

In addition, regarding "time" described in the following embodiment, the unit does not matter as long as an elapsed time from any reference time (for example, data configuration that manages the time generally used in OS represents the time based on an elapsed time from 0:00:00 of Jan. 1, 1970 of Greenwich mean time) is indicated. Consequently, "time" may be the day and the time of the day, and the time of the day may be expressed by "hours," "minutes," "seconds," "milliseconds" or a unit with higher precision. On the contrary, "time" may indicate only the date. Moreover, in expression capacity of data configuration that manages the "time" of the computer, an expression scope of the elapsed time may be a limited period. For example, "time" may indicate only the time excluding the date, and further, only the time expressed by "minutes," "seconds" or a shorter time unit excluding the date and "time" may be indicated.

FIG. 1 is a drawing showing a configuration example of an information processing system according to an embodiment.

The information processing system includes a management computer 100, a display computer 200, one or more servers 400, one or more storages 500, and a communication network 300 such as LAN (Local Area Network). The communication network 300 comprises one or more network apparatuses 301. The network apparatus 301 is an IP switch, a router or the like. The management computer 100, the display computer 200, the server 400, and the storage 500 are coupled to each other via the communication network 300. In this embodiment, the management computer 100 and the display computer 200 comprise a monitoring system.

Hereinafter, an apparatus comprising the information processing system (the server 400, the storage 500, the network apparatus 301 and the like) can also be called as "node apparatus." The information processing system may include, for example, a host computer, a NAS (Network Attached Storage), a file server, and a printer as a node apparatus. Moreover, a logical or physical component such as a device included by the node apparatus can also be called as "component." As an example of the component, a port, a processor, a memory resource, a storage device, a program, a virtual machine, a logical volume defined inside of a storage apparatus, and a RAID group or the like can be listed. Hereinafter, a node apparatus which is a target of monitoring with the management computer 100 can also be called as "monitoring-target apparatus," and a node apparatus or a component which is a target of monitoring with the management computer 100 can also be called as "monitoring-target object."

FIG. 2 is a drawing showing a configuration example of the management computer.

The management computer 100 is a computer that monitors the monitoring-target object and analyzes a cause of an event occurring in the monitoring-target object. The management computer 100 is a general computer for example, and includes a CPU (Central Processing Unit) 101, a memory resource 102, a network I/F (interface) 103, and an internal bus 104. The CPU 101, the memory resource 102, and the network I/F 103 are coupled to each other via the internal bus 104. The network I/F 103 is an interface device for coupling to the communication network 300. The memory resource 102 may be a memory, a secondary storage device such as a hard disk drive (HDD) or a combination of the memory and the secondary storage device.

The memory resource 102 stores an event detection program 111, a rule expansion program 112, a number of impacted nodes calculation program 113, a certainty calculation program 114, an event erase program 115, an event erase task generation program 116, and a weight object addition program 117. In addition, the memory resource 102 stores configuration information 121, a general rule repository 122, an expanded rule repository 123, rule memory data 124, an event information table (TBL) 125, and an event erase task table 126. The general rule repository 122 stores one or more general rules. The expanded rule repository 123 stores one or more expanded rules. Additionally, the configuration information 121 will be described later. The CPU 101 executes the programs 111 through 117 stored in the memory resource 102.

The management computer 100 receives various information such as an event message showing that an event occurs in the monitoring-target object (see FIG. 11) and information related to the monitoring-target apparatus or the entire configuration of the information processing system from the monitoring-target apparatus. The management computer 100 executes various processes such as a process of analyzing a cause of the event based on various information received from the monitoring-target apparatus, and outputs the process result to the display computer 200. Additionally, the management computer 100 may have a display function included by the display computer 200.

FIG. 3 is a drawing showing a configuration example of the display computer.

The display computer 200 is a computer which outputs various process results executed by the management computer 100 based on a request from the management computer 100. The display computer 200 is a general computer for example, and includes a CPU 201, a memory resource 202, a network I/F 203, an internal bus 204, and an input and output device 205. The CPU 201, the memory resource 202, the network I/F 203, and the input and output device 205 are coupled to each other via the internal bus 204. The CPU 201 executes a program stored in the memory resource 202. The memory resource 202 may be a memory, a secondary storage device such as a hard disk drive (HDD) or a combination of the memory and the secondary storage device. The memory resource 202 stores a displaying result display program 211, displaying configuration information 221, displaying event information 222, and a displaying analysis result 223.

The network I/F 203 is an interface device for coupling to the communication network 300. The input and output device 205 is an interface device for coupling to an input and output apparatus (a display 206 or the like). For example, the display 206 is coupled to the input and output device 205. The display computer 200 can submit the result of event cause analysis and the like to the administrator by displaying the result of event cause analysis or other information on the display 206. Additionally, the display computer 200 may include the display 206 therein.

Figure 4:
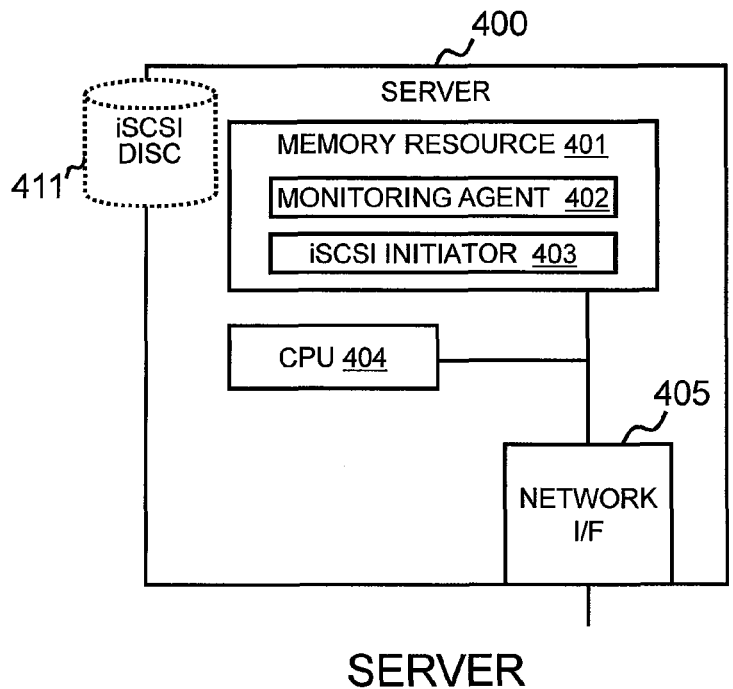
[FIG. 4]

FIG. 4 is a drawing showing a configuration example of a server.

The server 400 is a computer that executes an application and the like. The server 400 includes a CPU 404, a memory resource 401, and a network I/F 405. The network I/F 405 is an interface device to be coupled to the communication network 300. The memory resource 401 stores a monitoring agent 402 and an iSCSI (Internet Small Computer System Interface) initiator 403. The monitoring agent 402 is a program for transmitting an event message showing occurrence of the event to the management computer 100 when any event occurs in the monitoring-target object. Moreover, in the server 400, an iSCSI disc 411 which is a virtual volume to which a storage region of the storage 500 is allocated is formed. The iSCSI disc 411 is an entity virtually existing by the iSCSI initiator 403, and defined using LU (logical unit) provided from the storage 500. The server 400 can use the iSCSI disc 411 like a local hard disk via the iSCSI initiator 403. Additionally, while the iSCSI initiator 403 is a program that achieves its function in this embodiment, all or a part of its function may be substituted by hardware. The CPU 404 executes the monitoring agent 402 and the iSCSI initiator 403 stored in the memory resource 401.

Figure 5:
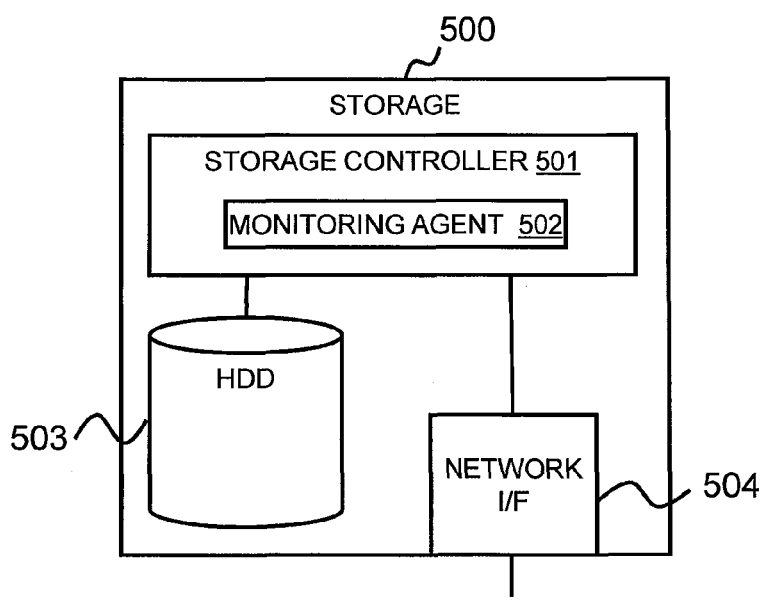
[FIG. 5]

FIG. 5 is a drawing showing a configuration example of the storage.

The storage 500 is an apparatus that provides a storage region to the server 400 and the like. The storage 500 includes a storage controller 501, a network I/F 504, and a storage medium 503 (in this embodiment, a hard disk drive (HDD)). The network I/F 504 is an interface device for coupling to the communication network 300. While the storage medium 503 is a hard disk drive in this embodiment, instead of this, other kinds of storage media such as a solid storage medium and an optical storage medium may be applied. The storage 500 provides a storage region for forming the iSCSI disc 411 to the server 400, for example. The storage controller 501 stores a monitoring agent 502 in a not shown memory resource. The monitoring agent 502 is a program for transmitting to the management computer 100 an event message showing the occurrence of the event when any event occurs in the storage 500. The monitoring agent 502 is executed by the CPU in the storage controller 501. Additionally, the monitoring agent 402 of the server 400 may be configured to monitor the event occurring in the storage 500 and transmit the event message of the event occurring in the storage 500 to the management computer 100.

In this embodiment, some monitoring-target apparatuses are, for example, an apparatus that provides a provision network of iSCSI volume or a network service such as a file-sharing service and a Web service (hereinafter, it is referred to as "service providing apparatus"). In addition, some monitoring-target apparatuses are an apparatus that uses a network service provided by the service providing apparatus (hereinafter, it is referred to as "service using apparatus"). For example, since the server 400 uses a provision service of iSCSI volume provided by the storage 500, it applies to the service using apparatus. On the other hand, since the storage 500 provides a provision service of iSCSI volume to the server 400 and the like, it applies to the service providing apparatus. As the service providing apparatus and the service using apparatus have a relationship to mutually provide and use the network service, the event occurring in one can be transmitted to the other. For example, in a case where a certain event occurs in the storage 500 corresponding to the service providing apparatus, affected by that, any event can occur also in the server 400 that uses the network service provided by the storage 500 (that is, the service using apparatus).

Here, configuration information 121 stored in the memory resource 102 of the management computer 100 will be explained. The configuration information 121 is information showing the configuration of the information processing system, and more specifically, is information showing what node apparatus comprises the information processing system, what configuration of each node apparatus is like (for example, what component the node apparatus has), what coupling relationship is established between node apparatuses or between components and what inclusion relationship is established between the node apparatus and the component or the like. Also, the configuration information 121 can include information related to provision or use of the network service (for example, identification information of the service using apparatus and information to be inputted to the service providing apparatus when the network service is used and the like). As the information to be inputted into the service providing apparatus, for example, iSCSI target name and LUN (logical unit number) to be inputted when the provision service of iSCSI volume is used and URL including the name of Web server to be inputted when the Web service is used can be listed. In this embodiment, the configuration information 121 includes a router management table 600 and an iSCSI target management table 700.

Figure 6:
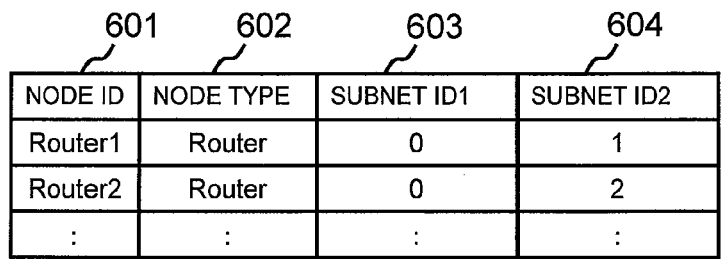
[FIG. 6]

FIG. 6 is a drawing showing an example of the router management table.

The router management table 600 is a table that manages information showing which subnets the router couples. The router management table 600 corresponds to a part of the configuration information 121. The router management table 600 manages, for each router, a node ID 601 storing the identifier of the router, a node type 602 storing the type of a node apparatus of the router, and subnet ID 603, 604 (subnet ID1, subnet ID2) storing the identifier of two subnets which the router couples, with association. According to the router management table 600 in FIG. 6, it can be found that a Router 1 couples a subnet 0 and a subnet 1, and a Router 2 couples the subnet 0 and a subnet 2.

Figure 7:
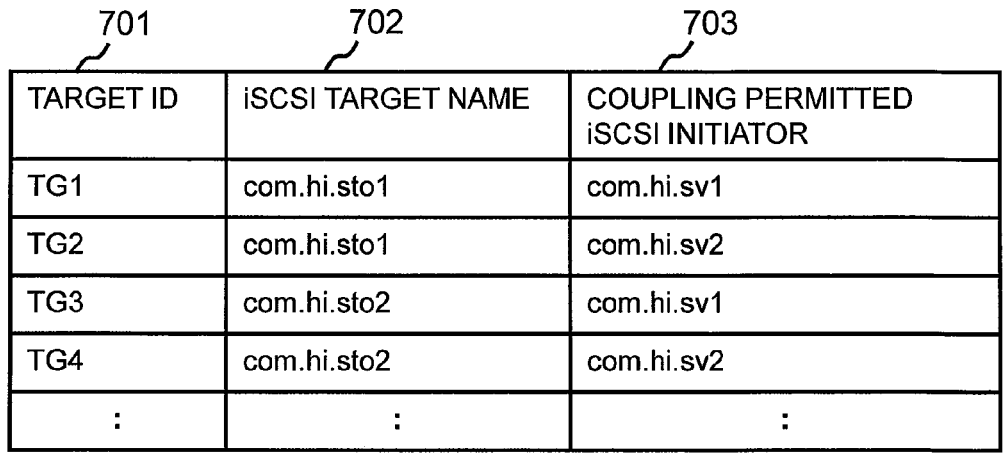
[FIG. 7]

FIG. 7 is a drawing showing an example of the iSCSI target management table.

The iSCSI target management table 700 is a table for managing information showing to which iSCSI initiator the iSCSI target permits the coupling. The iSCSI target management table 700 corresponds to a part of the configuration information 121. The iSCSI target management table 700 manages a target ID 701, an iSCSI target name 702, and a coupling permission iSCSI initiator name 703 with association.

The target ID 701 stores the identifier applied for each combination of the iSCSI target and the coupling permission iSCSI initiator. The iSCSI target name 702 stores the name of the iSCSI target. The coupling permission iSCSI initiator name 703 stores the name of the iSCSI initiator whose coupling is permitted. For example, from the information of target ID "TG1," it can be found that a storage 1 (com.hi.sto1) which is the iSCSI target permits the coupling to a server 1 (com.hi.sv1) which is the iSCSI initiator.

Figure 8:
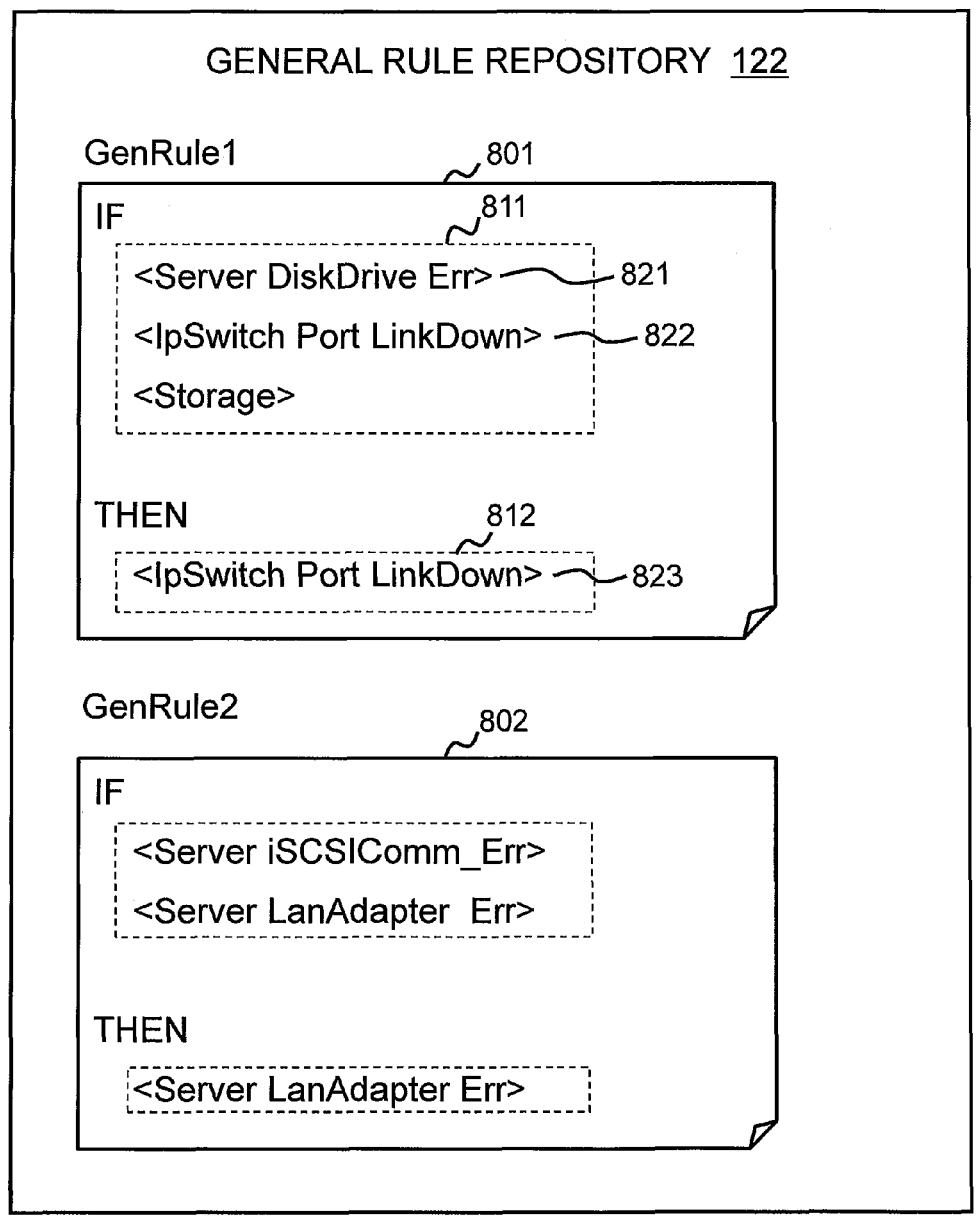
[FIG. 8]

FIG. 8 is a drawing showing an example of the general rule.

The general rule repository 122 stores one or more general rules. The general rule is the information that describes association between the condition showing the event and the conclusion showing the event specified as a cause in a case where the condition is satisfied in a form independent of an actual configuration of the information processing system. The general rule may include a plurality of conditions or a plurality of conclusions.

As shown in the drawing, a general rule 801 includes an IF part 811 and a THEN part 812. One or more conditions are described in the IF part 811, and a conclusion is described in the THEN part 812. The condition and conclusion respectively include the type of a node apparatus of the source of occurrence of the event and the type of the event. The IF part 811 may include an operator (for example, AND, OR, etc.) for specifying a method of calculating certainty. Additionally, another general rule 802 has the same configuration.

In the general rule 801 (GenRule 1), two conditions 821, 822 are described in the IF part 811. Moreover, one conclusion 823 is described in the THEN part 812. This general rule 801 represents that, in a case where two conditions 821 and 822 are satisfied, that is, an event shown by two conditions 821 and 822 is detected, an event shown by the conclusion 823 is specified as a cause.

More specifically, the condition 821 ("Server DiskDrive Err") shows an event in which the type of the node apparatus of the source of occurrence is "Server" and the type of the event is "DiskDrive Err," that is, a disk failure occurring in the server 400. Moreover, the condition 822 and the conclusion 823 ("IpSwitch Port LinkDown") shows an event in which the type of the node apparatus of the source of occurrence is "IpSwitch" and the type of event is "Port LinkDown," that is, a link failure of a port occurring in the IP switch. Accordingly, this general rule 801 represents that, in a case where the event of the disk failure occurring in the server 400 and the event of the link failure of a port occurring in the IP switch are detected, the event of the link failure of a port occurring in the IP switch is specified as a cause.

Additionally, while the general rule in this embodiment specifies the event by the type of the node apparatus of the source of occurrence, the event may be specified by the type of the monitoring-target object of the source of occurrence. That is, the event may be specified by the type of the node apparatus of the source of the occurrence and/or the type of the component. In the following description, an explanation will be made only with the node apparatus not using the component for simplification; however, it is needless to say that the general rule can be applied in a case where the type of the node apparatus and the type of the component are used as the condition if the explanation regarding the node apparatus is replaced with a combination of the node and the component.

Figure 9:
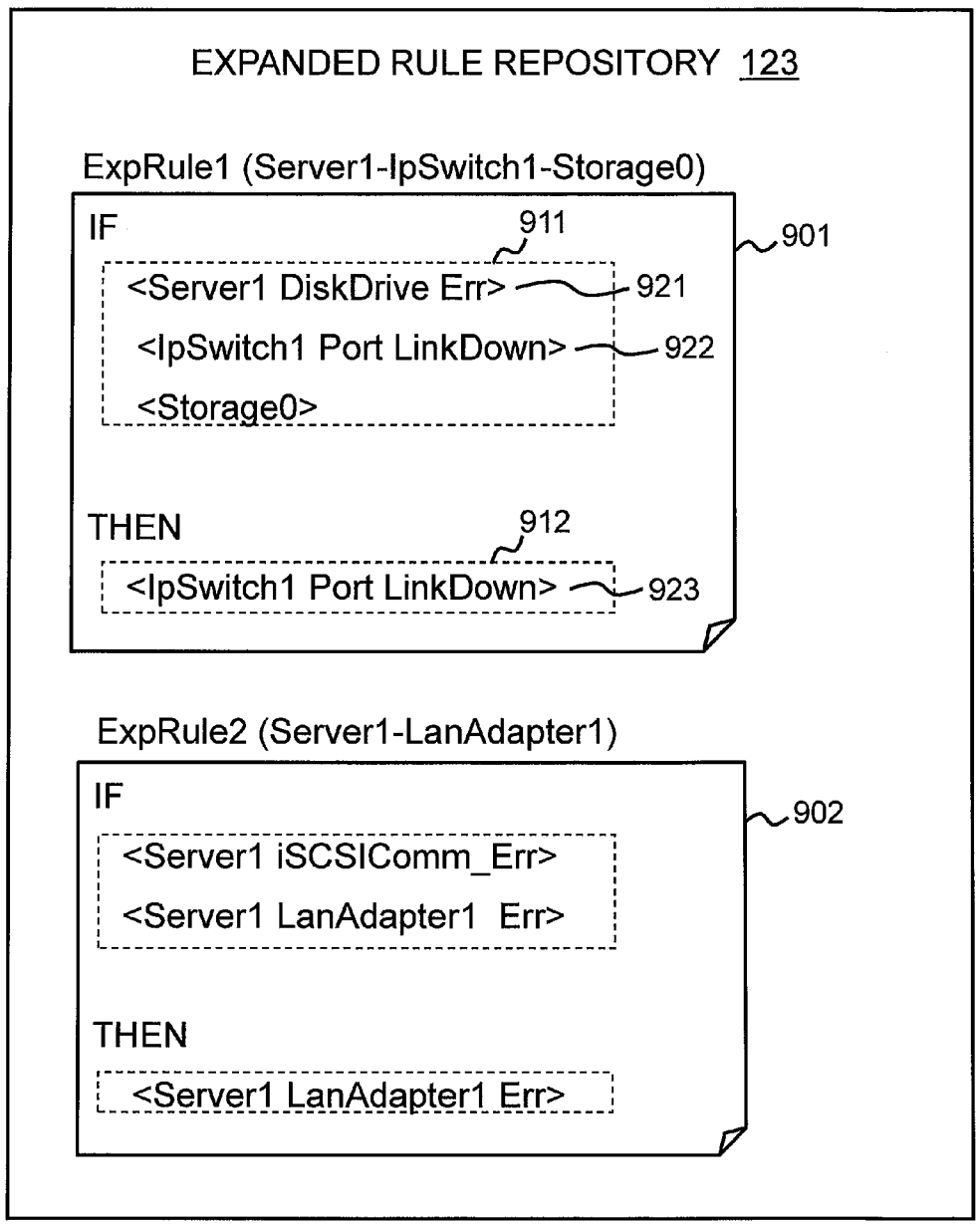
[FIG. 9]

FIG. 9 is a drawing showing an example of an expanded rule.

The expanded rule repository 123 stores one or more expanded rules. The expanded rule is the information in which the general information is expanded in the form dependent on an actual configuration of the information processing system. Similarly to the general rule, the expanded rule 901 includes an IF part 911 describing one- or more conditions and a THEN part 912 describing one or more conclusions. The condition and conclusion respectively include the name of the node apparatus of the source of occurrence of the event and the type of the event. The IF part 911 may include an operator to specify a method of calculating certainty. Additionally, another expanded rule 902 has the same configuration.

For example, when it is assumed that the information processing system includes one server 400 (server 1), one storage 500 (storage 0), and one IP switch (IP switch 1), the general rule 801 shown in FIG. 8 is expanded to the expanded rule 901 (ExpRule 1) shown in FIG. 9. The expanded rule 901 includes the condition and the conclusion showing the event related to the monitoring-target apparatus which is an actual component of the information processing system which are the server 1, the storage 0, and the IP switch 1. More specifically, the condition 921 ("Server1 DiskDrive Err") shows the event of a disk failure that occurs in the server 1. The condition 922 and the conclusion 923 ("IpSwitch1 Port LinkDown") shows the event of a link failure of a port that occurs in the IP switch 1. Accordingly, this expanded rule 901 represents that, in a case where the event of disk failure that occurs in the server 1 and the event of the link failure of a port that occurs in the IP switch 1 are detected, the event of the link failure of a port that occurs in the IP switch 1 is specified as a cause.

Additionally, while the expanded rule of the embodiment specifies the event by the name of the node apparatus of the source of the occurrence, the event may be specified by the name of the monitoring-target object of the source of occurrence. That is, the event may be specified by the name of the node apparatus of the source of occurrence and/or the name of the component.

Figure 10:
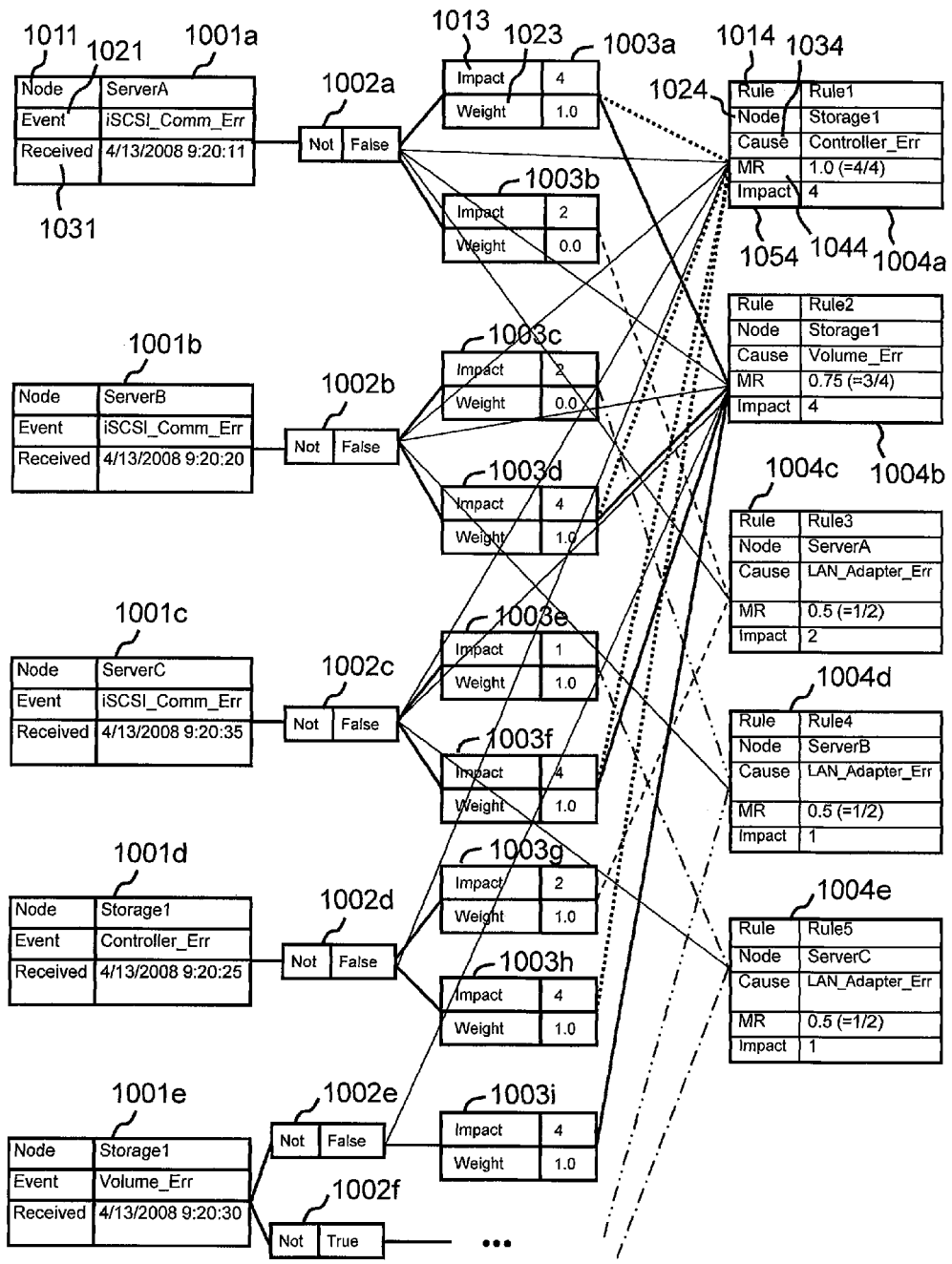
[FIG. 10]

FIG. 10 is a drawing showing an example of a rule memory data.

The rule memory data 124 is the data representing at least a plurality of expanded rules used for cause analysis of the event, the detection data related to the event shown by the condition of the expanded rule and the certainty which is the information of probability that the conclusion of the expanded rule is a cause (that is, the event shown by the conclusion is a cause) by a plurality of objects and their association. The rule memory data 124 is generated based on the general rule and the configuration information 121 for example, and used when cause analysis of the event is performed.

The rule memory data 124 includes, for example, a condition object 1001 (1001a, 1001b, etc.), a conclusion object 1004 (1004a, 1004b, etc.), an operator object 1002 (1002a, 1002b, etc.), a weight object 1003 (1003a, 1003b, etc.), and their coupling information. Additionally, each object is implemented as a structure or a class in a computer language for example, and it is the data (object data) stored in the memory resource 102 during the operation of the program.

The operator object 1002 is an object that manages the operator information for specifying a method of calculating certainty. Additionally, in the operator object, other than an object representing positive ("Not False" in the drawing), an object representing negative ("Not True" in the drawing) may exist.

The condition object 1001 corresponds to the condition of the expanded rule and the conclusion object 1004 corresponds to the conclusion of the expanded rule. The condition object 1001 and the conclusion object 1004 has a coupling relationship corresponding to association of the condition and the conclusion of the expanded rule. Additionally, the condition object 1001 and the conclusion object 1004 are coupled via the operator object 1002. Here, the conclusion object 1004 coupled to the condition object 1001 via the operator object 1002 is also referred to as the conclusion object 1004 coupled to the condition object 1001, and the condition object 1001 coupled to the conclusion object 1004 via the operator object 1002 is also referred to as the condition object 1001 coupled to the conclusion object 1004.

The condition object 1001 is an object that manages the event shown by the corresponding condition and the first detection data of the event. Here, the first detection data is the information showing whether the event is detected, more specifically, whether the management computer 100 receives an event message showing the occurrence of the event. The condition object 1001 includes, as information fields, "Node" 1011, "Event" 1021, and "Received" 1031. The name of the node apparatus of the source of occurrence of the managed event is configured in the "Node" 1011. The type of the managed event is configured in the "Event" 1021. The first detection data of the managed event is configured in the "Received" 1031. The first detection data is, for example, the receiving time of an event message showing that the managed event occurred.

In the example of FIG. 10, the condition object 1001a manages the event of communication failure of iSCSI of a server A and the first detection data of the event. The condition object 1001a shows that the event of communication failure of iSCSI of the server A was detected by the management computer 100 on "9:20:11 of Apr. 13, 2008" (more specifically, the management computer 100 received the event message).

The conclusion object 1004 is an object that manages the event shown by the corresponding conclusion and certainty showing the probability that the corresponding conclusion is a cause. The conclusion object. 1004 includes, as information fields, "Rule" 1014, "Node" 1024, "Cause" 1034, "MR" 1044, and "Impact" 1054. The name of the rule describing the corresponding conclusion is configured in the "Rule" 1014. The name of the node apparatus of the source of occurrence of the managed event is configured in the "Node" 1024. The type of the managed event is configured in the "Cause" 1034. The certainty of the corresponding conclusion is configured in the "MR" 1044. The certainty is calculated in a certainty calculation process which will be described later, and configured in the "MR" 1044.

The "Impact" 1054 is a field that manages an index value showing an affected range when the corresponding conclusion is a cause. Here, the affected range is a range of the occurrence of a failure affected by a cause when the cause occurs (that is, the cause event occurs). The area of the affected range can be expressed by, for example, the number of node apparatuses in which the event occurs affected by a cause when the cause occurs and the number of events that occurs affected by a cause when the cause occurs. In this embodiment, as an index value showing the affected range, the number of node apparatuses in which the event occurs affected by a cause when the cause occurs is adopted. Hereinafter, a node apparatus in which the event occurs affected by a cause when the cause occurs is called as "impacted node," and the number of the impacted nodes is called as "number of impacted nodes." In this embodiment, in the "Impact" 1054, the number of impacted nodes of the corresponding conclusion is configured.

In the example of FIG. 10, the conclusion object 1004a manages an event of a controller failure of the storage 1 and the certainty of the event (conclusion). To the conclusion object 1004a, four condition objects 1001a, 1001b, 1001c and 1001d are coupled. Each event managed by these four condition objects 1001a, 1001b, 1001c, and 1001d is an event that occurs affected by an event when the event managed by the conclusion object 1004a occurs. Consequently, a node apparatus which is the source of occurrence of each event managed by the four condition objects 1001a, 1001b, 1001c, and 1001d, that is, the server A, a server B, a server C, and the storage 1 are impacted nodes. Accordingly, the number of impacted nodes of the conclusion corresponding to the conclusion object 1004a is "4."

Additionally, in this embodiment, when a plurality of conditions associated with the conclusion show an event that occurs in the same node apparatus (for example, a drive error that occurs in the server A and a DNS error that occurs in the server A), the number of impacted nodes is counted as one for the same node apparatus (in the example in parenthesis, the server A). That is, no duplicate counting is performed for different events of the same node apparatus. Additionally, as an index value showing the affected range, not limited to the number of impacted nodes, for example, the number of events that occur affected by a cause when the cause occurs may be adopted, and in this case, duplicate counting may be performed for different events occurring in the same node apparatus.

The weight object 1003 is an object that manages, regarding the event managed by the condition object 1001, the second detection data (for example, the weight) showing validity or invalidity of the detection for each index value showing the affected range (for example the number of impacted nodes). The weight object 1003 is generated, regarding each condition object 1001, for the number of impacted nodes of one or more conclusions associated with the condition corresponding to the condition object 1001.

The weight object 1003 is coupled to each of the condition object 1001 and the conclusion object 1004 related to the managed second detection data. More specifically, the weight object 1003 that manages the second detection data related to a certain number of impacted nodes (here, "index value 1") of a certain event (here, "event 1") is coupled to each of the condition object 1001 that manages the event 1 and the conclusion object 1004 which is coupled to the condition object 1001 that manages the event 1 and in which the index value 1 is configured. Additionally, the condition object 1001 and the weight object 1003 are coupled via the operator object 1002. Here, the weight object 1003 coupled to the condition object 1001 via the operator object 1002 is also referred to as the weight object 1003 coupled to the condition object 1001, and the condition object 1001 coupled to the weight object 1003 via the operator object 1002 is also referred to as the condition object 1001 coupled to the weight object 1003.

In the example of FIG. 10, the weight object 1003a is coupled to each of the condition object 1001a and the conclusion object 1004b. That is, this weight object 1003a manages the second detection data related to the number of impacted nodes (that is, "4") configured in the coupled conclusion object 1004b of the event (that is, the event of communication failure of iSCSI of the server A) managed by the coupled condition object 1001a. Incidentally, the condition object 1001a and the conclusion object 1004b coupled to the weight object 1003a are coupled to each other (that is, the corresponding condition and conclusion are associated.)

The weight object 1003 includes, as information fields, the "Impact" 1013 and the "Weight" 1023. In the "Impact" 1013, the number of impacted nodes related to the managed second detection data is configured. Additionally, in the weight object 1003 and the conclusion object 1004 coupled to each other, the same number of impacted nodes is configured.

In the "Weight" 1023, the second detection data is configured. In this embodiment, as the second detection data, a weight value is configured. The weight applies the value of "0.0" or "1.0" for example. The weight value "0.0" shows that the detection of the event is invalidated, that is, the event is not yet detected (that is, the received time is not yet configured in the "Received" 1031 of the condition object 1001 that manages the event) or the event is not handled as the detected event in a cause analysis even though the event is detected. On the other hand, the weight value "1.0" shows that the detection of the event is valid, that is, the event is detected and handled as the detected event in a cause analysis. For example, in a case where the event managed by the condition object 1001a (the event of communication failure of iSCSI of the server A) is detected, the weight value "1.0" is configured in the field "Weight" 1023 of the weight object 1003a, 1003b coupled to the condition object 1001a, and detection of the event becomes valid.

Additionally, the management computer 100 calculates the certainty managed by each conclusion object 1004 based on the existence or non-existence of the detection in the past predetermined time (this time width is referred to as "analysis time width") of the event managed by each condition object 1001 in a cause analysis. As an example of a concrete process, in a cause analysis, the existence or non-existence of the detection of the event is judged by referring whether the weight managed by each weight object 1003 is configured to valid or invalid, and based on the existence or non-existence of the detection, the certainty is calculated. Accordingly, the analysis time width can be achieved by the time width from the time when the event is detected and the weight is configured to valid to the time when the weight is configured to invalid, that is, the validity period of the detection of the event. That is, the same value as the analysis time width is configured as the validity period. In this way, since the same value as the analysis time width is configured as the validity period of the detection of the event, hereinafter, the validity period of the event is also referred to as "analysis time width."

Additionally, in addition to the validity or invalidity of the detection of the event, the weight may be a value which can show the probability of the validity when it is valid. More specifically, it may be configured such that the weight is a value of "0.0" to "1.0," the weight value "0.0" shows that the detection of the event is invalid, the weight value excluding "0.0" shows that the detection of the event is valid, and the magnitude of the numerical value shows the probability of the validity. In such a case, for example, it can be configured such that the probability of validity is decreased in accordance with the elapse of time. More specifically, for example, the weight value may be configured to "1.0" during a set period from the detection of the event, and thereafter, it may be gradually decreased to "0.0."

In this way, regarding each event managed by the condition object 1001, by managing the second detection data for each index value showing the affected range, the timing to invalidate the detection of the event can be varied for each index value showing the affected range. That is, the analysis time width can be varied for each index value showing the affected range.

Additionally, the rule memory data 124 is not limited to the configuration explained in FIG. 10, and other data configurations which can express the association between the condition and the conclusion, the first and second detection data related to the event, and the certainty of the conclusion may be adopted.

Figure 11:
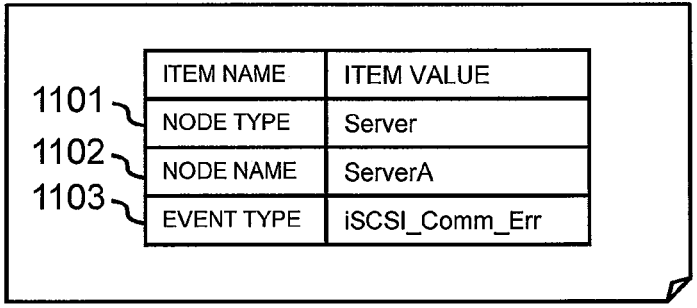
[FIG. 11]

FIG. 11 is a drawing showing an example of an event message.

The event message 1100 is the information showing that the event occurs in the monitoring-target object, and transmitted to the management computer 100 by the monitoring agents 402 and 502. The event message 1100 includes, as information fields, the node type 1101, the node name 1102, and the event type 1103. The node type 1101 stores the type of the node apparatus of the source of the occurrence of the event. The node name 1102 stores the name of the node apparatus of the source of occurrence of the event. The event type 1103 stores the type of the event.

Figure 12:
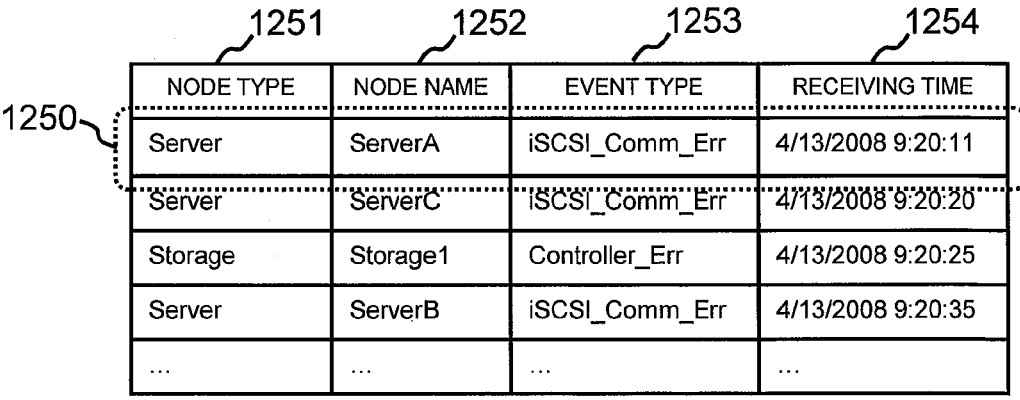
[FIG. 12]

FIG. 12 is a drawing showing an example of an event information table.

The event information table 125 is a table that manages an event entry 1250 related to the occurring event. When the event detection program 111 receives the event message 1100, it prepares the event entry 1250 related to the event notified by the received event message 1100 and inserts it in this table 125.

Each event entry 1250 includes, as the information fields, a node type 1251, a node name 1252, an event type 1253, and a receiving time 1254. The node type 1251 stores the type of the node apparatus of the source of occurrence of the event. The node name 1252 stores the name of the node apparatus of the source of occurrence of the event. The event type 1253 stores the type of the event. The receiving time 1254 stores the receiving time of the event message 1100 showing the occurrence of the event. Additionally, the detection of the event is not necessarily detected by the event message as in FIG. 11. For example, the event detection may be recognized if, the event detection program repeatedly obtains the value of the state of the monitoring-target object and the like, and compares the value with the difference from the previous time and when a predetermined condition (for example, the previous time obtains a normal state and the current time obtains an abnormal state) is satisfied.

Figures 13, 14:
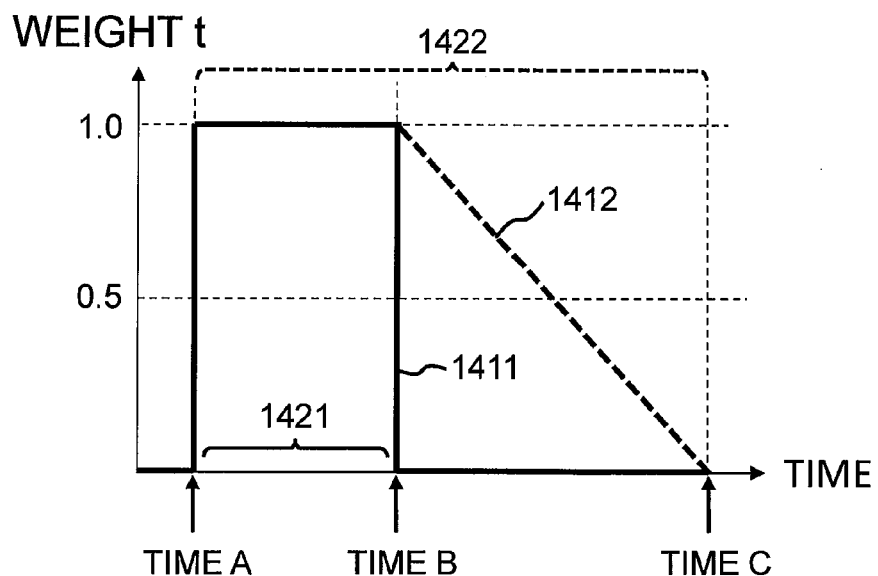
[FIG. 13]
[FIG. 14]

FIG. 13 is a drawing an example of an event erase task table.

The event erase task table 126 is a table that manages an event erase task entry 1260 related to an event erase task. Here, the event erase task is a task for, regarding the event in which the analysis time width from its detection has elapsed, performing the process of resetting the weight related to the event, that is, configuring the weight as invalid. The event erase task is generated in an event erase task generation process (see FIG. 20) which will be described later at the time of detection of the event. The event erase task is generated for each weight object 1003 whose weight is configured to valid. Hereinafter, the event related to the weight managed by the weight object 1003 which is an event erase task process target is referred to as "erase process target event," and the number of impacted nodes related to the weight managed by the weight object 1003 which is an event erase task process target is referred to as "erase process-target number of impacted nodes."

Each event erase task entry 1260 includes, as the information fields, for example, a start time 1261, a node name 1262, an event type 1263, the number of impacted nodes 1264, and a receiving time 1265. The node name 1262 stores the name of the node apparatus of the source of the occurrence of the erase process target event. The event type 1263 stores the type of the erase process target event. The number of impacted nodes 1264 stores the erase process-target number of impacted nodes. The receiving time 1265 stores the receiving time of the event message 1100 showing the occurrence of the erase process target event. The start time 1261 stores the start time of the execution of the event erase task (hereinafter, it is referred to as "erase process start time.")

The erase process start time is, for example, the time when the analysis time width determined related to the erase process-target number of impacted nodes of an erase process target event is elapsed from the time when the erase process target event is detected. The event in which the analysis time width has elapsed is excluded from a target of a certainty calculation process. The value of the analysis time width is determined, regarding one event, based on the number of impacted nodes of the conclusion associated with the condition showing the event. For example, if there are several kinds of number of impacted nodes of the conclusion associated with the condition showing the event, each value is determined based on each number of impacted nodes. The analysis time width is, based on the number of impacted nodes, calculated by the following formula 1 or 2.

Analysis time width=$T0 \times Ni$ (Formula 1)

Analysis time width=$T0 \times (1+\log(Ni))$ (Formula 2)

Here, T0 is the validity period of event detection for one impacted node and a predetermined reference value. Additionally, at least one reference value is sufficient, however, for example, the reference value may be prepared for each combination of the type of the node apparatus and the type of the event. Ni is the number of impacted nodes. Formulas 1 and 2 are defined such that the analysis time width becomes larger as the number of impacted nodes increases. Because of this, regarding the conclusion with large affected range, a cause analysis can be performed using a larger analysis time width. Additionally, in this embodiment, the analysis time width is determined when the event erase task is generated, however, it may be determined before a cause analysis is performed.

FIG. 14 is a drawing showing an example of weight value change.

A solid line 1411 shows a change of the weight in this embodiment (that is, the weight in which the probability of validity of event detection is not considered). In the time A when the event is detected, the weight value is configured as "1.0." In such a case, an analysis time width 1421 of the detected event is determined based on the number of impacted nodes related to this weight. After that, in the time B when the analysis time width 1421 has elapsed, the weight value is configured as "0.0." Additionally, regarding the event related to this weight, the detection is handled as valid in a case where a cause analysis is performed from the time A to the time B after the analysis time width 1421 has elapsed, and thereafter, the detection is handled as invalid until the event is detected again.

On the other hand, a dashed line 1421 shows an example of weight change considering the probability of the validity of event detection. Similarly to the case where the probability of validity is not considered (the solid line 1411), in the time A in which the event is detected, the weight value is configured to "1.0," and the weight value is set to be constant until the time B when the predetermined validity period to handle the weight as constant has elapsed. After that, the weight value is gradually decreased, and configured to "0.0" at the time C. Additionally, in such a case, regarding the event related to the weight, the detection is handles as valid when a cause analysis is performed from the time A to the time C, and after that, the detection is handles as invalid until the event is detected again. Consequently, in this case, a time width 1422 from the time A to the time C is the analysis time width. Moreover, from the time B to the time C, certainty is calculated also considering that the probability of validity of event detection is not the maximum. Additionally, the weight attrition from the time B to the time C is not limited to a linear attrition as in the figure, and attrition along a polygonal line or a curved line may be adopted.

Hereinafter, an example of a calculation method of the weight considering the probability of validity of event detection. This example shows an example in which the inclination of attrition of the weight becomes gradual as the number of impacted nodes increases.

(1) First, based on the following Formula 3, the event excess time is calculated.

Event excess time=current time−(receiving time of the event+validity period) (Formula 3)

(Here, the validity period is a period in which the weight value is handled as constant of "1.0" and previously configured.)

(2) Next, based on the following Formula 4, the amount of attrition is calculated.

The amount of attrition=attrition rate×event excess time÷(1+log(number of impacted nodes))  (Formula 4)

(Here, attrition rate is a predetermined value.)

(3) Next, the following process is performed.

(3-1) As a result of (2), when the amount of attrition is less than 0, the weight value is set to "1.0."

(3-2) As a result of (2), when the amount of attrition is larger than 1, the weight value is set to "0.0."

(3-3) As a result of (2), when the amount of attrition is equal to or larger than 0 and equal to or less than 1, the weight value is set to a value in which the amount of attrition is subtracted from "1.0."

Hereinafter, each process performed by the management computer 100 will be explained with reference to a flow chart.

Figure 15:
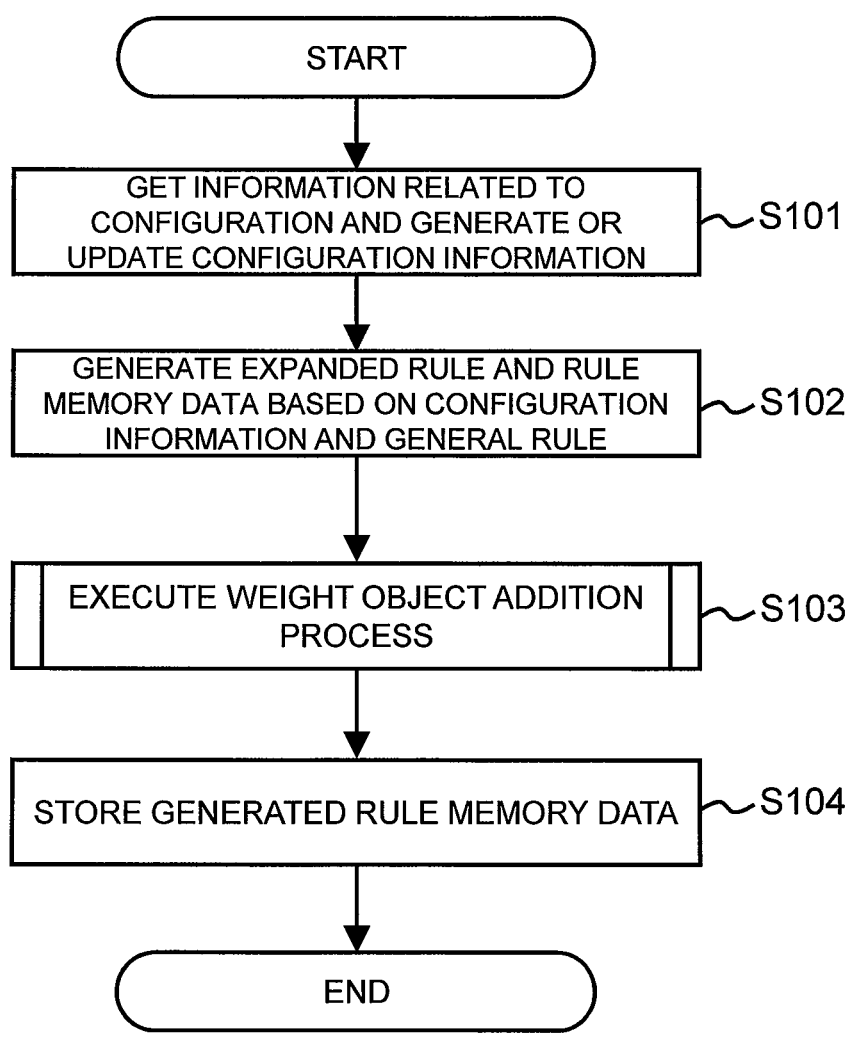
[FIG. 15]

FIG. 15 is a flow chart of a rule expansion process.

The rule expansion process is a process to generate an expanded rule and the rule memory data 124 based on the configuration information 121 and the general rule. The management computer 100 may perform a rule expansion process before monitoring of the monitoring-target object is performed, that is, before the detection of the event to previously generate the rule memory data 124, or may perform a rule expansion process after the detection of the event or in executing certainty calculation process (see FIG. 19) which will be described later to generate all or a part of the rule memory data 124 on demand. The rule memory data 124 or the expanded rule may be a temporary product when the management computer 100 executes a cause analysis of the event.

First, the rule expansion program 112 obtains the information related to the configuration from the monitoring-target apparatus, and based on the obtained information, it generates or updates the configuration information 121 (step S101).

Next, the rule expansion program 112 generates the expanded rule and the rule memory data 124 based on the configuration information 121 and the general rule (step S102). More specifically, in this step the rule expansion program 112 (A) searches a combination of the node apparatuses satisfying the relationship between the condition and conclusion of the general rule from the configuration information 121 and adds the identifier of the node apparatus to the condition and conclusion of the general rule in the searched combination to prepare the expanded rule, and (B) prepares the condition object, the conclusion object, and the operator object corresponding to the condition and the conclusion of the expanded rule in the memory data 124. Additionally, the rule memory data 124 generated herein is the data in an intermediate state in which the weight object 1003 is not yet included.

Next, the rule expansion program 112 causes the weight object addition program 117 to execute a weight object addition process (see FIG. 16) (step S103). By this weight object addition process, the weight object 1003 is added to the rule memory data 124 in an intermediate state generated in step S102, and the rule memory data 124 in a final state is generated.

After that, the rule expansion program 112 stores the generated rule memory data 124 in the memory resource 102 (step S104), and terminates the rule expansion process.

Figure 16:
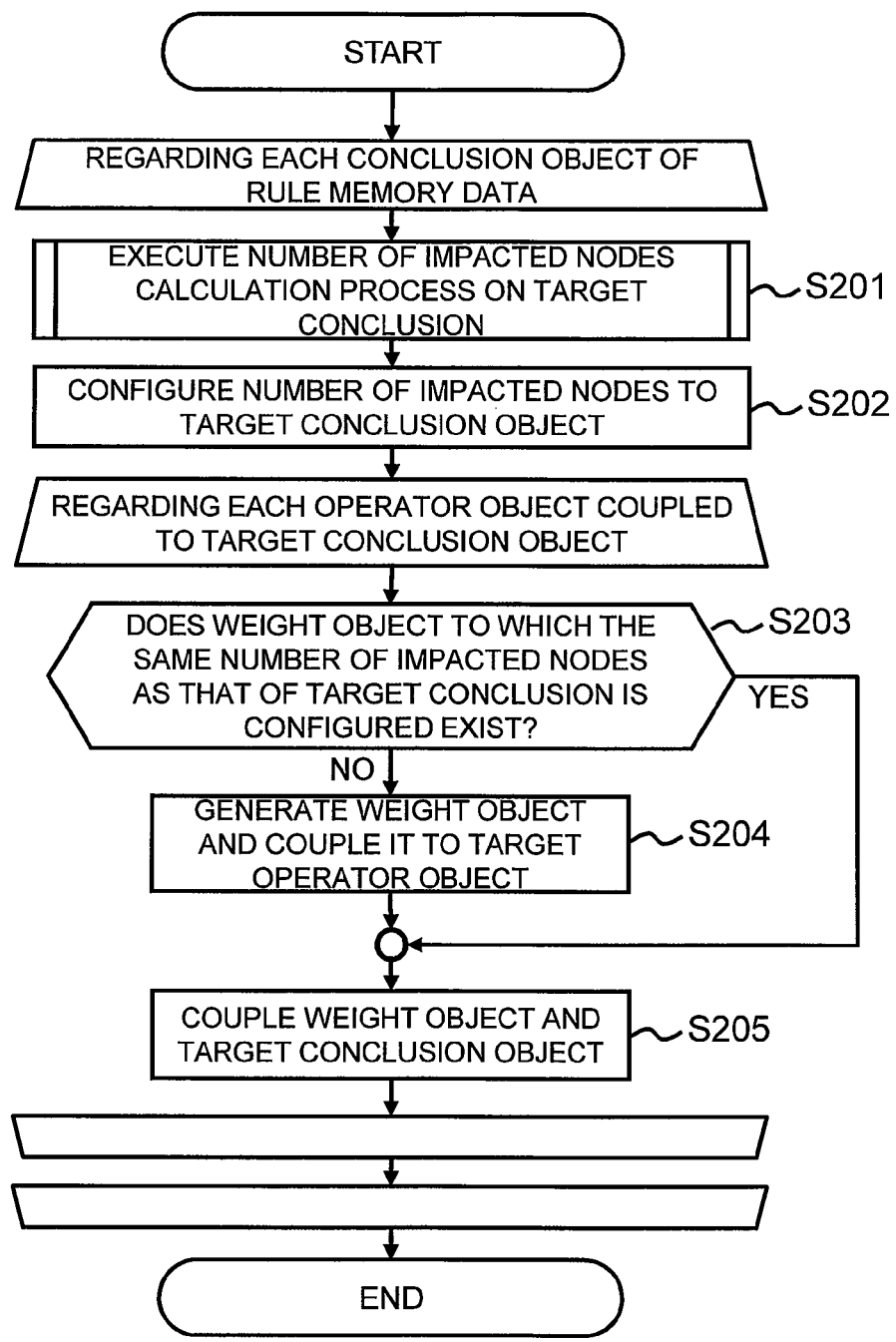
[FIG. 16]

FIG. 16 is a flow chart of a weight object addition process.

The weight object addition process is a process to add the weight object 1003 to the rule memory data 124 in an intermediate state. The weight object addition process corresponds to the process of step S103 of FIG. 15.

The weight object addition program 117 repeats, for each conclusion object 1004 included in the rule memory data 124, processes of steps S201 to S205. First, the weight object addition program 117 selects one conclusion object 1004 included in the rule memory data 124 (in the following steps S201 to S205, it is referred to as "target conclusion object").

The weight object addition program 117 inputs a parameter specifying the conclusion corresponding to the target conclusion object 1004 (hereinafter, it is referred to as "target conclusion") into the number of impacted nodes calculation program 113 to execute a number of impacted nodes calculation process (see FIG. 17) regarding the target conclusion. (step S201). By this number of impacted nodes calculation process, the number of impacted nodes of the target conclusion is calculated.

Next, the weight object addition program 117 configures the number of impacted nodes of the target conclusion calculated in step S201 to an "Impact" 1054 of the target conclusion object 1004 (step S202).

After that, the weight object addition program 117 repeats, for each operator object 1002 coupled to the target conclusion object 1004, processes of steps S203 to S205. The weight object addition program 117 selects one operator object 1002 coupled to the target conclusion object 1004 (in the following steps S203 to S205, it is referred to as "target operator object").

The weight object addition program 117 judges whether the weight object 1003 to which the same number of impacted nodes as that of the target conclusion is configured (hereinafter, it is referred to as "the same index value weight object") exists in the weight object 1003 coupled to the target operator object 1002 (step S203). This judgment is performed by judging whether the value of the "Impact" 1013 corresponds to the number of impacted nodes of the target conclusion regarding each weight object 1003 coupled to the target operator object 1002. Additionally, the condition object 1001 coupled to the operator object 1002 corresponds to one of the conditions associated with the target conclusion. Consequently, the weight object 1003 coupled to the target operator object 1002 which is a target of judgment herein is the weight object 1003 that manages the weight related to one of the conditions associated with the target conclusion (the weight related to the event shown by the condition).

In a case where the same index value weight object 1003 does not exist (step S203: NO), the weight object addition program 117 generates one weight object 1003, and configures the number of impacted nodes of the target conclusion to the "Impact" 1013 of the generated weight object 1003. In addition, the weight object addition program 117 couples the generated weight object 1003 and the target operator object 1002 (step S204).

Thereafter, the weight object addition program 117 couples the weight object 1003 generated in step S204 and the target conclusion object 1004 (step S205).

On the other hand, when it is judged that the same index value weight object 1003 exists in step S203 (step S203: YES), the weight object addition program 117 performs a process of step S205 without executing a process of step S204, that is, not generating a new weight object 1003. In this case, the weight object addition program 117 couples the same index value weight object 1003 and the target conclusion object 1004 in step S205. This allows the sharing of the weight object 1003 among a plurality of conclusion objects 1004 having the same number of impacted nodes associated with the same condition.

terminates, After processes of steps S203 to S205 for each operator object 1002 coupled to the target conclusion object 1004 are completed, and processes of steps S201 to S205 for each conclusion object 1004 included in the rule memory data 124 are completed, the weight object addition program 117 terminates the weight object addition process.

In this way, the management computer 100 calculates the number of impacted nodes of each conclusion, and regarding each condition, generates the weight object for each number of impacted nodes of the conclusion associated with the condition. Moreover, the weight object 1003 is shared among the plurality of conclusion objects 1004 having the same number of impacted nodes associated with the same condition. This reduces the amount of necessary data for the weight object 1003 and the data size of the rule memory data 124 can be reduced. Moreover, since the number of objects in the rule memory data 124 and the number of coupling between the objects are reduced, the required time for configuration change of the weight can be reduced. Additionally, regarding the plurality of conclusion objects having the same number of impacted nodes associated with the same condition object, the weight object 1003 may be generated independently without sharing of the weight object 1003.

Figure 17:
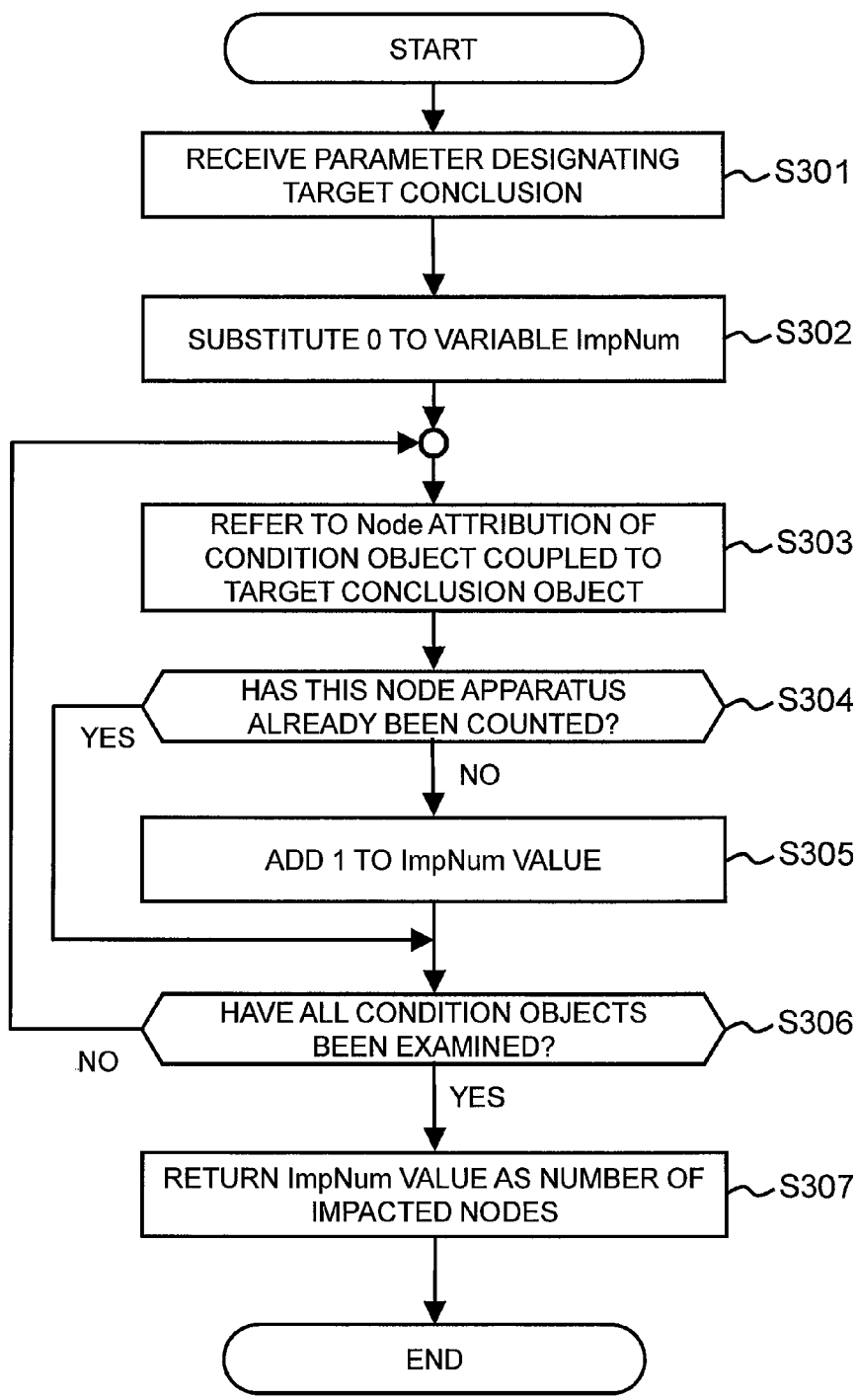
[FIG. 17]

FIG. 17 is a flow chart of a number of impacted nodes calculation process.

The number of impacted nodes calculation process is a process for calculating the number of impacted nodes regarding the conclusion inputted from the weight object addition program 117. The number of impacted nodes calculation process corresponds to a process of step S201 in FIG. 16.

When the number of impacted nodes calculation program 113 receives a parameter specifying the conclusion which is a target of calculation of the number of impacted nodes (in the explanation of FIG. 17, it is referred to as "target conclusion") from the weight object addition program 117, it substitutes 0 into a variable "ImpNum" (step S302).

Next, the number of impacted nodes calculation program 113 obtains one condition object 1001 (in the following steps S303 to S305, it is referred to as "target condition object") coupled to the conclusion object 1004 corresponding to the target conclusion (in the explanation of FIG. 17, it is referred to as "target conclusion object"), refers to the "Node" 1011 of the target condition object 1001, and specifies the node apparatus which is the source of occurrence of the event managed by the target condition object 1001 (step S303). This specified node apparatus is the node apparatus belonging to the affected range when the target conclusion is a cause, that is, the node apparatus that generates the event by being affected (impacted node).

After that, the number of impacted nodes calculation program 113 judges whether the node apparatus specified in step S303 is the counted node apparatus (step S304).

When the node apparatus specified in step S303 is not the counted node apparatus (step S304: NO), the number of impacted nodes calculation program 113 adds 1 to the value of the variable "ImpNum," stores the information which shows the specified node apparatus as the counted node apparatus to the memory resource 102 (step S305) and proceeds to step S306.

On the other hand, when the node apparatus specified in step S303 is the counted node apparatus (step S304: YES), the number of impacted nodes calculation program 113 proceeds to step S306 without performing a process of step S305. That is, when the node apparatus which is the source of occurrence of the event is identical, the number of impacted nodes calculation program 113 does not perform duplicate counting of these identical node apparatuses.

After that, the number of impacted nodes calculation program 113 judges whether processes in and after step S303 are executed about all condition objects 1001 coupled to the target conclusion object 1004, that is, whether these condition objects are a target of the counting of the number of impacted nodes (step S306).

As a result, when the condition object 1001 which is not a target of the counting of the number of impacted nodes still exists in the condition object 1001 coupled to the target conclusion object 1004 (step S306: NO), the number of impacted nodes calculation program 113 selects the condition object 1001 which is not a target of the counting as the target condition object 1001 and performs processes in and after step S303 again.

On the other hand, when all condition objects 1001 coupled to the target conclusion object 1004 are a target of the counting of the number of impacted nodes (step S306: YES), the number of impacted nodes calculation program 113 outputs the value of the variable "ImpNum" to the weight object addition program 117 as the number of impacted nodes of the target conclusion and terminates the number of impacted nodes calculation process.

In this way, the management computer 100 calculates the number of impacted nodes of the target conclusion by counting the number of node apparatuses as the source of occurrence of the event managed by the condition object 1001 coupled to the target conclusion object 1004 based on the rule memory data 124. Additionally, the management computer 100 may count the number of impacted nodes of the target conclusion by counting the number of node apparatuses which is the source of occurrence of the event shown by the condition associate with the target conclusion based on the expanded rule.

Figure 18:
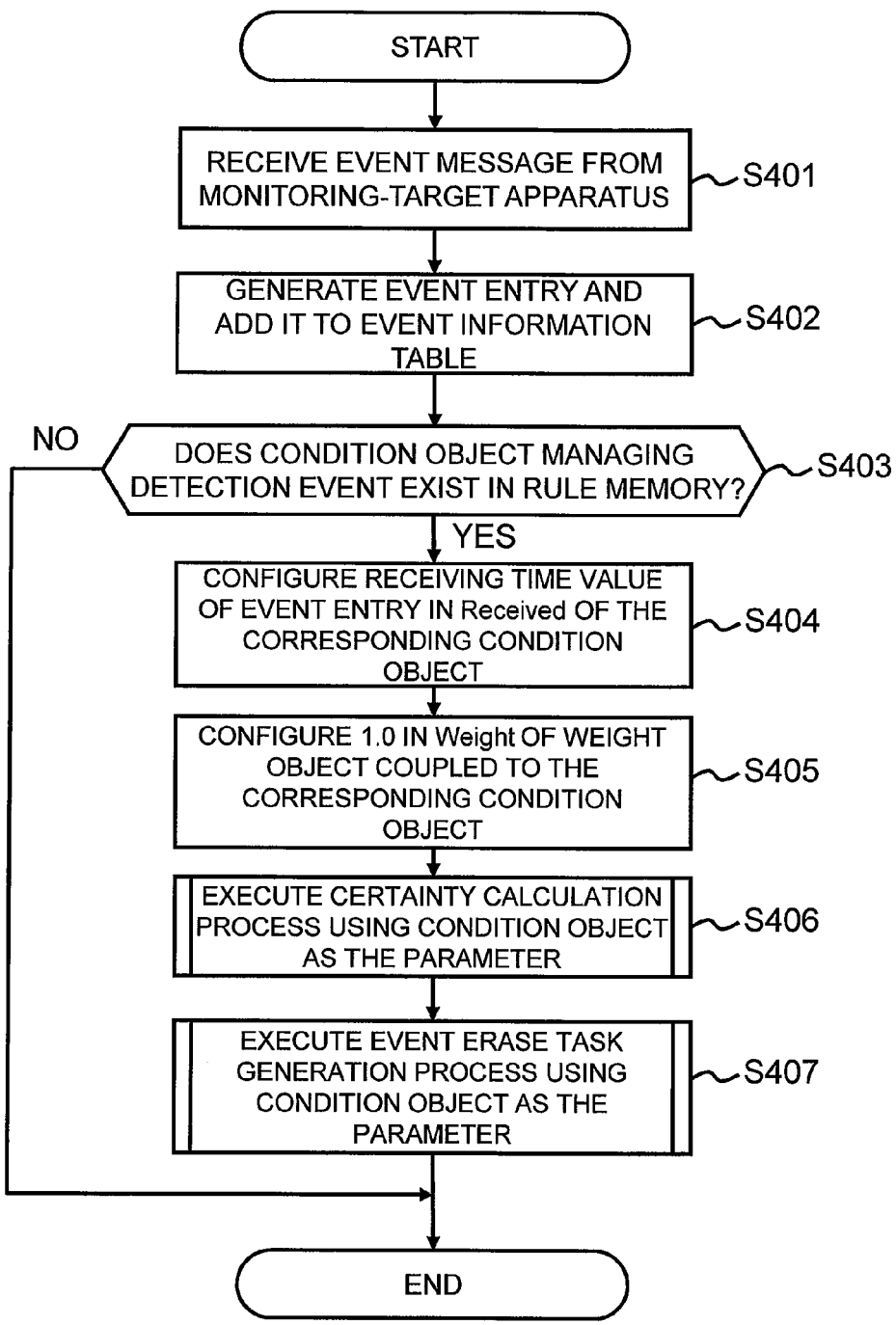
[FIG. 18]

FIG. 18 is a flowchart of an event detection process.

The event detection process is a process performed when the management computer 100 receives the event message 1100 from the monitoring-target apparatus.

First, the event detection program 111 receives the event message 1100 from the monitoring-target apparatus (more specifically, the monitoring agents 402, 502 in the monitoring-target apparatus) (step S401).

Next, the event detection program 111 prepares the event entry 1250 related to the event (hereinafter, it is referred to as "detection event") shown by the received event message 1100 (hereinafter, it is referred to as "receiving message"). The event entry 1250 related to the detection event stores the type and the name of the node apparatus which is the source of occurrence of the detection event, the type of the detection event and the receiving time of the receiving message 1100 included in the receiving message 1100. Moreover, the event detection program 111 adds the prepared event entry 1250 in the event management table 125 (step S402).

After that, the event detection program 111 judges whether the condition object 1001 that manages the detection event exists in the rule memory data 124 (step S403). More specifically, the event detection program 111 searches the rule memory data 124 using the type of the detection event and the name of the node apparatus which is the source of occurrence of the detection event as a key, and judges whether the condition object 1001 (the condition object 1001 that manages the detection event) in which the type of the event configured in the "Event" 1021 and the name of the node apparatus which is the source of occurrence configured in the "Node" 1011 correspond to the key exists.

When the condition object 1001 that manages the detection event does not exist in the rule memory data 124 (step S403: NO), the event detection program 111 terminates the event detection process.

On the other hand, when the condition object 1001 that manages the detection event exists in the rule memory data 124 (step S403: YES), the event detection program 111 configures the receiving time of the receiving message 1100 to the "Received" 1031 of the condition object 1001 that manages the detection event (step S404).

Moreover, the event detection program 111 configures the weight value "1.0" to the "Weight" 1023 of each weight object 1003 coupled to the condition object 1001 that manages the detection event (step S405).

After that, the event detection program 111 causes the certainty calculation program 114 to execute a certainty calculation process using a parameter that specifies the condition object 1001 that manages the detection event as an input (step S406). By this certainty calculation process, certainty is calculated about each conclusion associated with the condition showing the detection event and the result is returned.

After that, the event detection program 111 causes the event erase task generation program 116 to execute an event erase task generation process using the parameter that specifies the condition object 1001 that manages the detection event as an input (step S407). By this event erase task generation process, regarding each weight object 1003 coupled to the condition object 1001 that manages the detection event, an event erase task for resetting the configured weight after the elapse of the analysis time width is generated. After that, the event detection program 111 terminates the event detection process.

In this way, when the management computer 100 receives the event message 1100, it adds the event entry 1250 related to the detection event to the event information table 125, configures the weight related to the detection event as valid (more specifically, the weight value is configured to "1.0"), calculates certainty based on the rule memory data 124, and generates the event erase task for resetting the weight related to the detection event.

Figure 19:
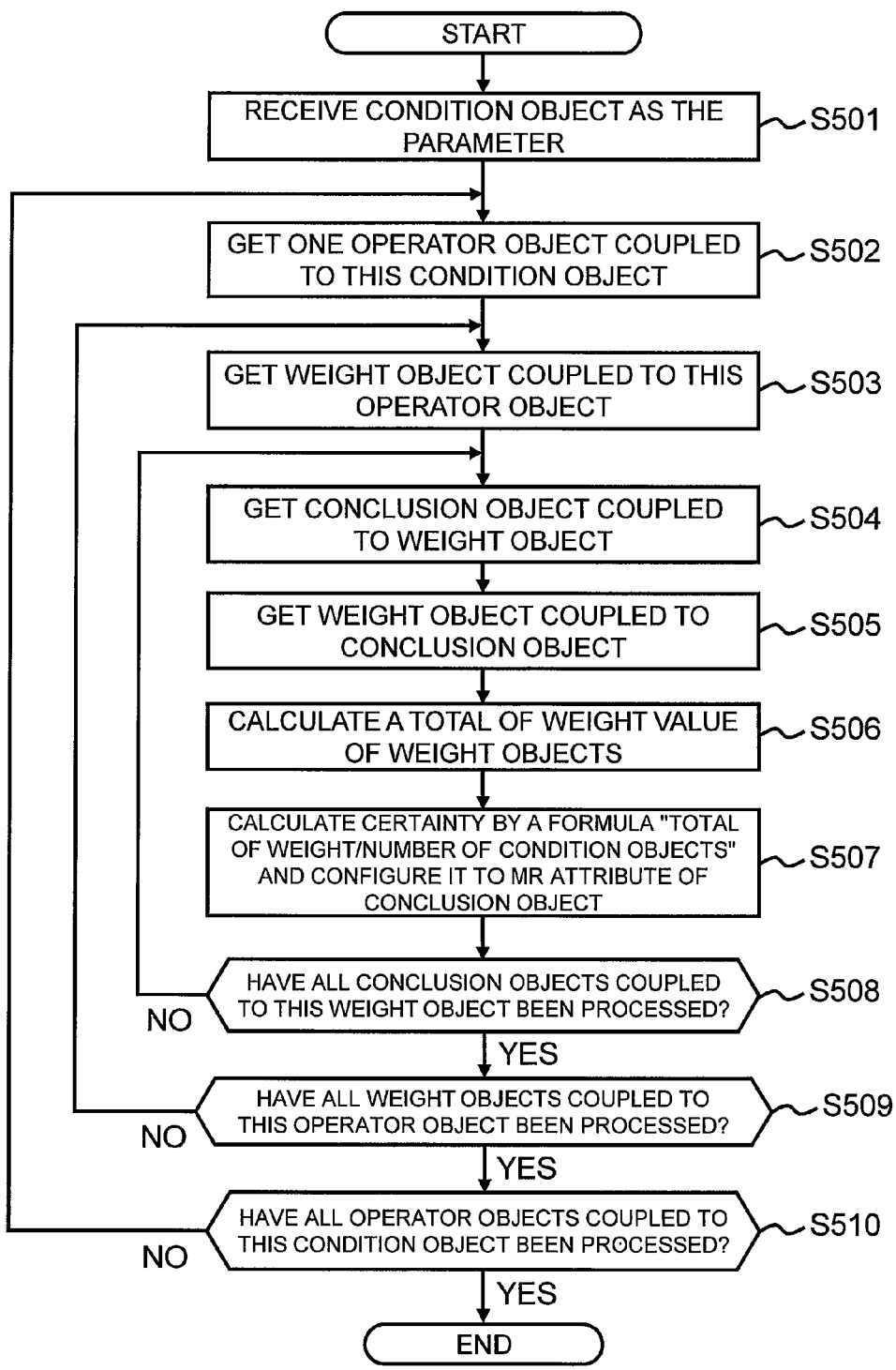
[FIG. 19]

FIG. 19 is a flow chart of a certainty calculation process.

The certainty calculation process is a process that calculates, regarding each conclusion object 1004 coupled to the inputted condition object 1001, the certainty of the conclusion based on the rule memory data 124. The certainty calculation process corresponds to the process of step S406 in FIG. 18 or a process of step S708 in FIG. 21.

The certainty calculation program 114 receives a parameter that specifies the condition object 1001 which is a target of a process inputted by the event detection program 111 or the event erase program 115 (in the explanation of FIG. 19, it is referred to as "target condition object") (step S501).

First, the certainty calculation program 114 obtains one operator object 1002 (in the following steps S502 to S509, it is referred to as "target operator object") coupled to the target condition object 1001 from the rule memory data 124 (step S502).

Next, the certainty calculation program 114 obtains one weight object 1003 (in the following steps S503 to S508, it is referred to as "target weight object") coupled to the target operator object 1002 from rule memory data 124 (step S503).

Next, the certainty calculation program 114 obtains one conclusion object 1004 (in the following steps S504 to S507, it is referred to as "target conclusion object") coupled to the target weight object 1003 from the rule memory data 124 (step S504). Additionally, in the following steps S504 to S507, the conclusion corresponding to the target conclusion object 1004 is referred to as "target conclusion."

Thereafter, the certainty calculation program 114 obtains all the weight objects 1003 coupled to the target conclusion object 1004 from the rule memory data 124 (step S505). Additionally, the weight objects 1003 obtained herein are all coupled to the condition object 1001 corresponding to the condition associated with the target conclusion via the operation identification object 1002, and manage the weight related to the condition associated with the target conclusion. That is, in this step S505, all of the weight objects 1003 that manage the weight related to the number of impacted nodes of the target conclusion in each condition associated with the target conclusion are obtained.

Moreover, the certainty calculation program 114 totalizes the weight values configured in each weight object 1003 obtained in step S505, that is, the values configured in the "Weight" 1023 (step S506).

After that, the certainty calculation program 114 calculates the certainty of the target conclusion by dividing "total weight" by "number of condition objects." Here, the "total weight" is the total weight value calculated in step S505 and the "number of condition objects" is the number of condition objects 1001 coupled to the target conclusion object 1004. Additionally, the weight shows whether the event detection is valid or invalid, and when the value is set to two values of "1.0" or "0.0," the "total weight" is the number of events in which the event detection is valid (that is, the event in which the analysis time width has not elapsed from the event detection). That is, the calculated certainty shows the rate of the event whose detection is valid among the events shown by the condition associated with the target conclusion. Moreover, the certainty calculation program 114 configures the calculated certainty to the field "MR" 1044 of the target conclusion object 1004 (step S507).

Thereafter, the certainty calculation program 114 judges whether the processes of steps S504 to S507 are performed about all the conclusion objects 1004 coupled to the target weight object 1003 (step S508).

When the conclusion object 1004 coupled to the target weight object 1003 to which the processes of steps S504 to S507 are not yet performed exists (step S508: NO), the certainty calculation program 114 performs the processes of steps S504 to S507 to the unprocessed conclusion object 1004.

On the other hand, when the processes of steps S504 to S507 are performed about all the conclusion objects 1004 coupled to the target weight object 1003 (steps S508: YES), the certainty calculation program 114 judges whether the processes of steps S503 to S508 are performed about all the weight objects 1003 coupled to the target operator object 1002 (step S509).

When the weight object 1003 coupled to the target operator object 1002 to which the processes of steps S503 to S508 are not yet performed exists (step S509: NO), the certainty calculation program 114 performs the processes of steps S503 to S508 to the unprocessed weight object 1003.

On the other hand, when the processes of steps S503 to S508 are performed about all the weight objects 1003 coupled to the target operator object 1002 (step S509: YES), the certainty calculation program 114 judges whether the processes of steps S502 to S509 are performed about all the operator objects 1002 coupled to the target condition object 1001 (step S510).

When the operator object 1002 coupled to the target condition object 1001 to which the processes of steps S502 to S509 are not yet performed exists (step S510: NO), the certainty calculation program 114 performs the processes of steps S502 to S509 to the unprocessed operator object 1002.

On the other hand, when the processes of steps S502 to S509 are performed about all the operator objects 1002 coupled to the target condition object 1001 (step S510: YES), the certainty calculation program 114 terminates the certainty calculation process.

Figure 24:
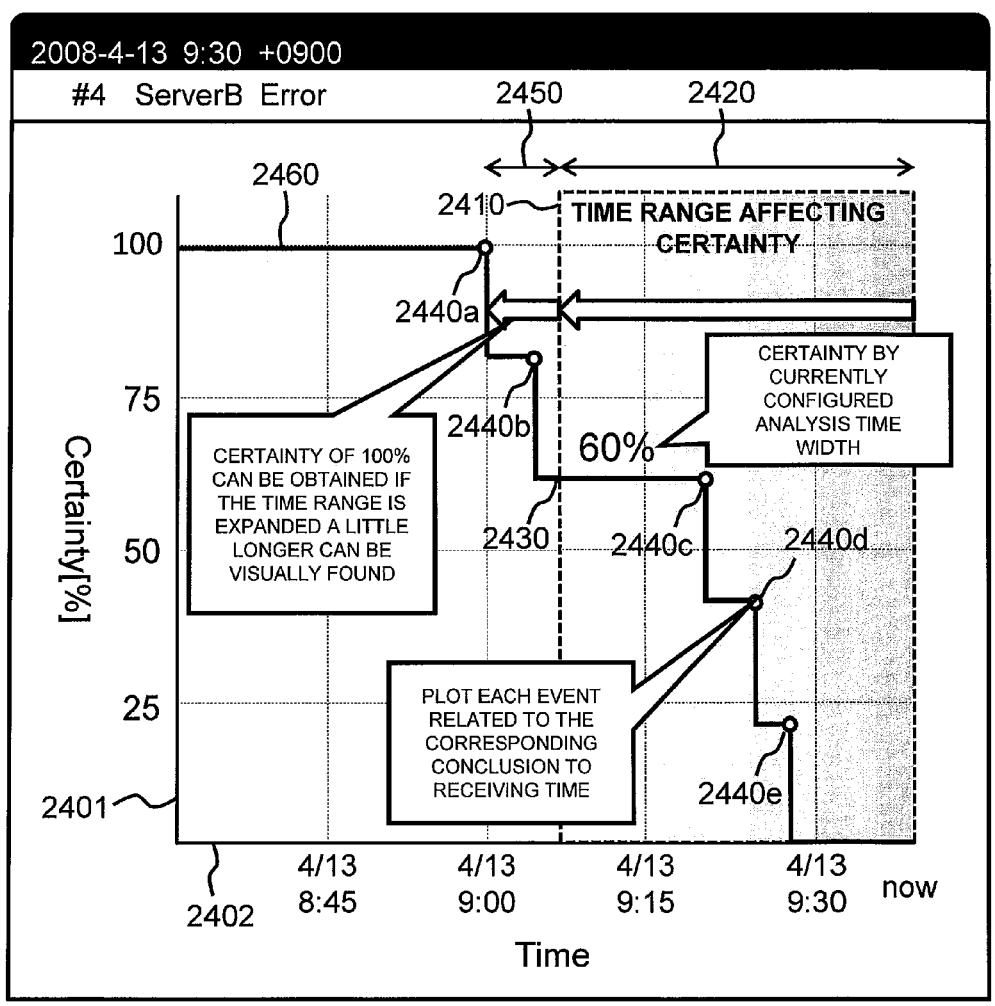
[FIG. 24]

In this way, the management computer 100 calculates the certainty of each conclusion associated with the condition corresponding to the inputted condition object 1001 based on the rule memory data 124. When the certainty of each conclusion is calculated, the weight related to the number of impacted nodes of the conclusion of each condition associated with the conclusion is referred, and the number of events whose detection is valid among the events shown by the condition associated with the conclusion is obtained. In addition, the management computer 100 determines the conclusion which has the probability of becoming a root cause, that is, a candidate of the root cause (hereinafter, it is referred to as "cause candidate") based on the calculated certainty. For example, the management computer 100 detects the conclusion object 1004 whose certainty exceeds a predetermined value from the rule memory data 124, and determines the conclusion corresponding to the detected conclusion object 1004 as a cause candidate. Moreover, for example, the management computer 100 extracts several conclusion objects 1004 in descending order of certainty from the rule memory data 124, and determines the conclusion corresponding to the extracted conclusion object 1004 as the cause candidate. In addition, the management computer 100 displays the information of the result of cause analysis showing the cause candidate (the first and second analysis result display screens and the like: FIGS. 23 and 24) on the display 206 coupled to the display computer 200. Additionally, in calculating the certainty, another calculating formula may be adopted as long as it outputs a value meaning that a higher certainty has been obtained if many events shown by the condition are detected.

Figure 20:
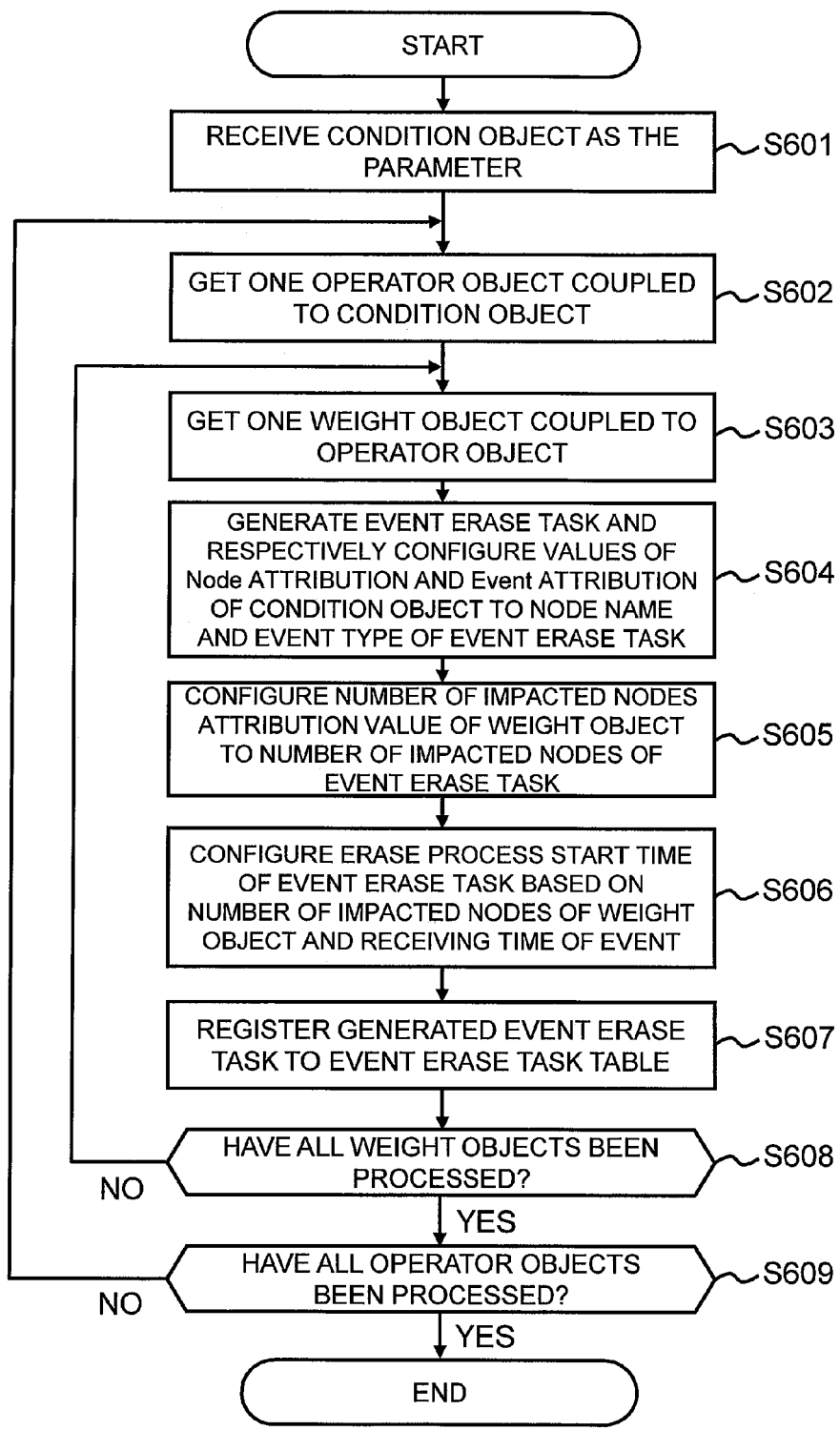
[FIG. 20]

FIG. 20 is a flow chart of an event erase task generation process.

The event erase task generation process is a process that generates an event erase task about each weight object 1003 coupled to the condition object 1001 inputted from the event detection program 111 based on the rule memory data 124. The event erase task generation process corresponds to the process of step S407 in FIG. 18.

When the event erase task generation program 116 receives a parameter that specifies the condition object 1001 (in the explanation of FIG. 20, it is referred to as "target condition object") which is a target of a process from the event detection program 111, it obtains one operator object 1002 (in the following steps S602 to S608, it is referred to as "target operator object") coupled to the target condition object 1001 from the rule memory data 124 (step S602).

Next, the event erase task generation program 116 obtains one weight object 1003 (in the following steps S603 to S607, it is referred to as "target weight object") coupled to the target operator object 1002 from the rule memory data 124 (step S603).

After that, the event erase task generation program 116 generates an event erase task for processing the target weight object 1003 (hereinafter, in the explanation of FIG. 20, it is referred to as "target event erase task"), and prepares the event erase task entry 1260 related to the target event erase task (hereinafter, in the explanation of FIG. 20, it is referred to as "target event erase task entry") (if the target event erase task entry has already been generated, the preparation may be omitted). Moreover, the event erase task generation program 116 stores the name of the node apparatus configured in the "Node" 1011 and the type of the event configured in the "Event" 1021 of the received condition object 1001 to the node name 1262 and the event type 1263 of the target event erase task entry 1260. In addition, the event erase task generation program 116 configures or updates the receiving time 1265 of the target event erase task entry 1260 to the receiving time configured to the "Received" 1031 of the received condition object 1001 (step S604).

Moreover, the event erase task generation program 116 stores the number of impacted nodes configured in the "Impact" 1013 of the target weight object 1003 to the number of impacted nodes 1264 of the target event erase task entry 1260 (step S605).

Moreover, the event erase task generation program 116 calculates the analysis time width related to the target event erase task based on the number of impacted nodes configured in the target weight object 1003. Moreover, the event erase task generation program 116 determines the erase process start time of the target event erase task based on the analysis time width related to the calculated target event erase task and the receiving time of the event managed by the received condition object 1001. In addition, the event erase task generation program 116 stores the determined erase process start time to the start time 1261 of the target event erase task entry 1260 (step S606).

After that, the event erase task generation program 116 registers the target event erase task entry 1260 to the event erase task table 126 (step S607).

After that, the event erase task generation program 116 judges whether the processes of steps S603 to S607 are executed about all the weight objects 1003 coupled to the target operator object 1002 (step S608).

When the weight object 1003 coupled to the target operator object 1002 to which the processes of steps S603 to S607 are not yet performed exists (step S608: NO), the event erase task generation program 116 performs the processes of steps S603 to S607 to the unprocessed weight object 1003.

On the other hand, when the processes of steps S603 to S607 are performed about all the weight objects 1003 coupled to the target operator object 1002 (step S608: YES), the event erase task generation program 116 judges whether the processes of steps S602 to S608 are performed about all the operator objects 1002 coupled to the target condition object 1001 (step S609).

When the operator object 1002 coupled to the target condition object 1001 in which the processes of steps S602 to S608 are not yet performed exists (step S609: NO), the event erase task generation program 116 performs the processes of steps S602 to S608 to the unprocessed operator object 1002.

On the other hand, when the processes of steps S602 to S608 are performed about all the operator objects 1002 coupled to the target condition object 1001 (step S609: YES), the event erase task generation program 116 terminates the event erase task generation process.

Figure 21:
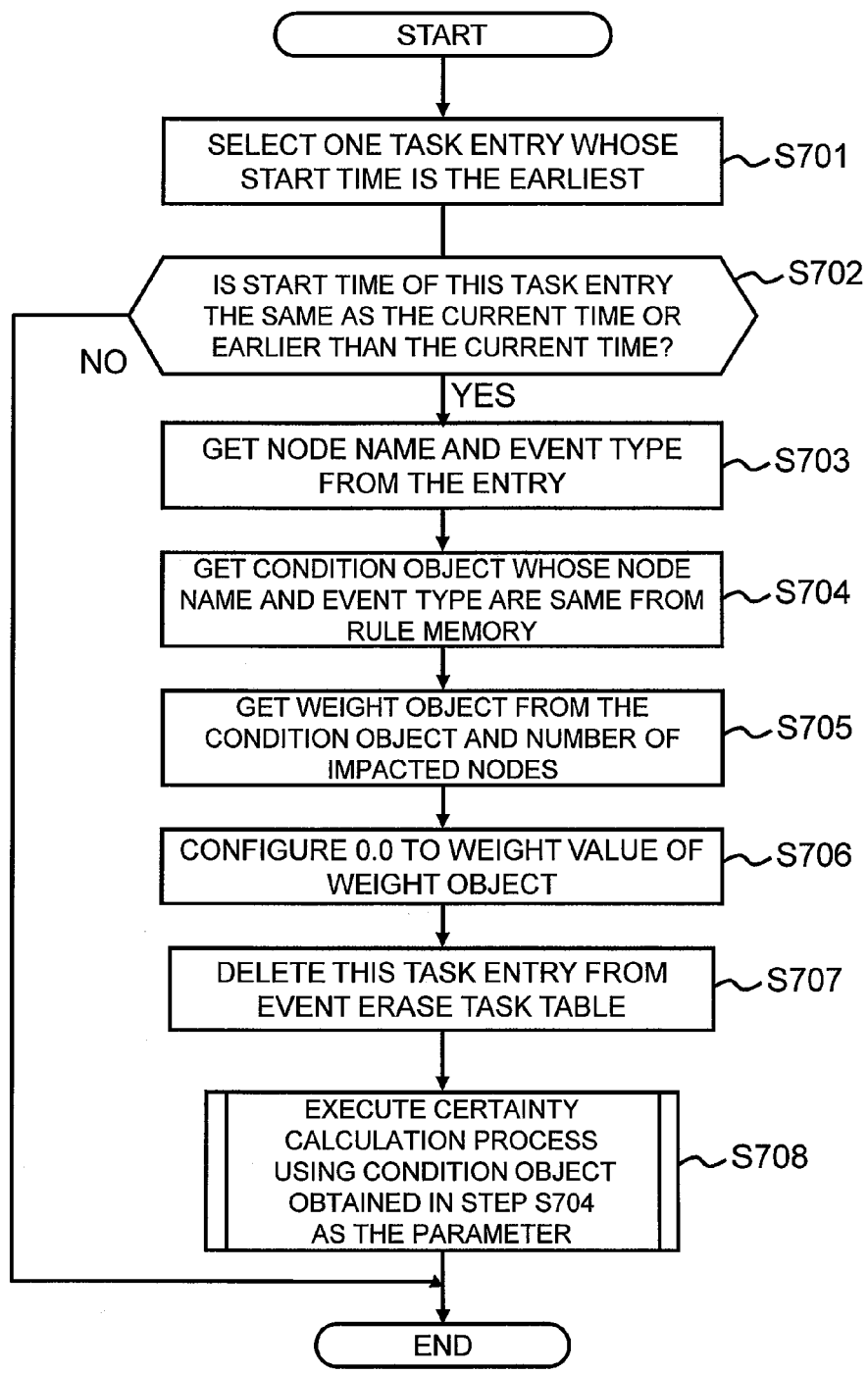
[FIG. 21]

FIG. 21 is a flow chart of an event erase process.

The event erase process is a process that performs and manages the event erase task to reset the weight related to the event in which the analysis time width has elapsed from its detection. The event erase process is repeatedly performed (for example, for each predetermined time interval). This time interval may be relatively small time interval compared to the analysis time width. First, the event erase program 115 selects and obtains one event erase task entry 1260 whose start time is the earliest from the event erase task table 126 (step S701).

Next, the event erase program 115 judges whether the start time of the obtained event erase task entry 1260 is the same as the current time or earlier than the current time (step S702). As a result of that, when the start time of the obtained event erase task entry 1260 is neither the same as the current time nor earlier than the current time (step S702: NO), this means that there is no event erase task to be executed, so that the event erase program 115 terminates the event erase process.

On the other hand, when the start time of the obtained event erase task entry 1260 is the same as the current time or earlier than the current time (step S702: YES), the event erase program 115 starts the execution of the event task (hereinafter, in the explanation of FIG. 21, it is referred to as "target event erase task") corresponding to the event erase task entry (hereinafter, in the explanation of FIG. 21, it is referred to as "target event erase task entry"). That is, the event erase program 115 obtains the name of the node apparatus of the source of occurrence of the erase process target event and the type of the erase process target event from the node name 1262 and the event type 1263 of the target event erase task entry 1260 (step S703). Additionally, the erase process target event is the event related to the weight managed by the weight object 1003 which is a target of the process of the target event erase task.

Next, the event erase program 115 obtains the condition object 1001 that manages the erase process target event from the rule memory data 124 (step S704). More specifically, the event erase program 115 searches the rule memory data 124 using the name of the node apparatus which is the source of occurrence of the erase process target event and the type of the erase process target event obtained in step S703 as a key to obtain the condition object 1001 (the condition object 1001 that manages the erase process target event) in which the name of the node apparatus of the source of occurrence configured in the "Node" 1011 and the type of the event configured in the "Event" 1021 corresponds to the key.

Next, the event erase program 115 obtains the weight object 1003 in which the same value of the number of impacted nodes as one stored in the number of impacted nodes 1264 of the target event erase task entry 1260 coupled to the condition object 1001 obtained in step S704 is configured (step S705). Additionally, the weight object 1003 obtained herein is the weight object 1003 which is a target of the process of the target event erase task.

After that, the event erase program 115 configures the weight value "0.0" to the "Weight" 1023 of the weight object 1003 obtained in step S705 (step S706).

Moreover, the event erase program 115 deletes the target event erase task entry 1260 from the event erase task table 126 (step S707).

After that, the event erase program 115 causes the certainty calculation program 114 to execute the certainty calculation process (FIG. 19) using a parameter that specifies the condition object 1001 that manages the erase process target event obtained in step S702 as an input (step S708). By this certainty calculation process, regarding each conclusion associated with the condition showing the erase process target event, certainty is re-calculated. Thereafter, the event erase program 115 terminates the event erase process.

In this way, the management computer 100 configures the weight related to the event in which the analysis time width has been elapsed from its detection as invalid (more specifically, the weight value is configured to "0.0") by executing the event erase task in which the current time reaches the erase process start time. After that, the management computer 100 executes the certainty calculation process to re-calculate the certainty of each conclusion associated with the condition related to the weight configured as invalid.

Moreover, focusing on the weight object 1003 in the rule memory data 124, first, for each condition, the weight object 1003 is generated for each number of impacted nodes of one or more conclusions associated with the condition. Moreover, the weight managed by the weight object 1003 is configured as valid at the time when the event related to the weight is detected. On the other hand, by the event erase task information 1260, the time to configure the weight as invalid (the erase process start time) is managed for each weight object 1003 in which the weight is configured as valid. In other words, by the event erase task information 1260, for each weight object 1003 in which the weight is configure as valid, the analysis time width of the event related to the weight is managed. Here, the analysis time width is determined based on the number of impacted nodes such that, for example, the analysis time width increases as the number of impacted nodes increases. Moreover, the weight managed by each weight object 1003 is configured as invalid at the time when the analysis time width managed by the event erase task information 1260 has elapsed from the time when the event related to the weight is detected.

In this way, by managing the second detection data (in this embodiment, the weight) for each weight object 1003, the analysis time width can be varied for each event having different index value showing the affected area (in this embodiment, the number of impacted nodes). By doing this, the certainty can be calculated using different analysis time width for the conclusion having different index value showing the affected range, even if the same event is included. In addition, by configuring such that the analysis time width is made larger as the index value showing the affected range increases, the certainty can be calculated using a larger analysis time width to the conclusion having a large affected range, even if the same event is included. Consequently, for example, even if the scale of the information processing system is large, uniformly making the analysis time width larger is unnecessary, which allows a relatively large analysis time width to be used for the conclusion with a large affected range in which the difference of the period of occurrence of the event is considered to be relatively larger, and a relatively small analysis time width to be used for the conclusion with a small affected range. This prevents the failure of the event detection in a cause analysis and reduces the possibility of inclusion of a noise, which improves the accuracy of the analysis.

Here, while the corresponding event erase task (steps S703 to S708) is executed by comparing the start time of the event erase task table 126 with the current time in this embodiment, for example, the event erase task may be executed at the start time by previously configuring such that the event erase task is activated at the corresponding start time.

Figure 22:
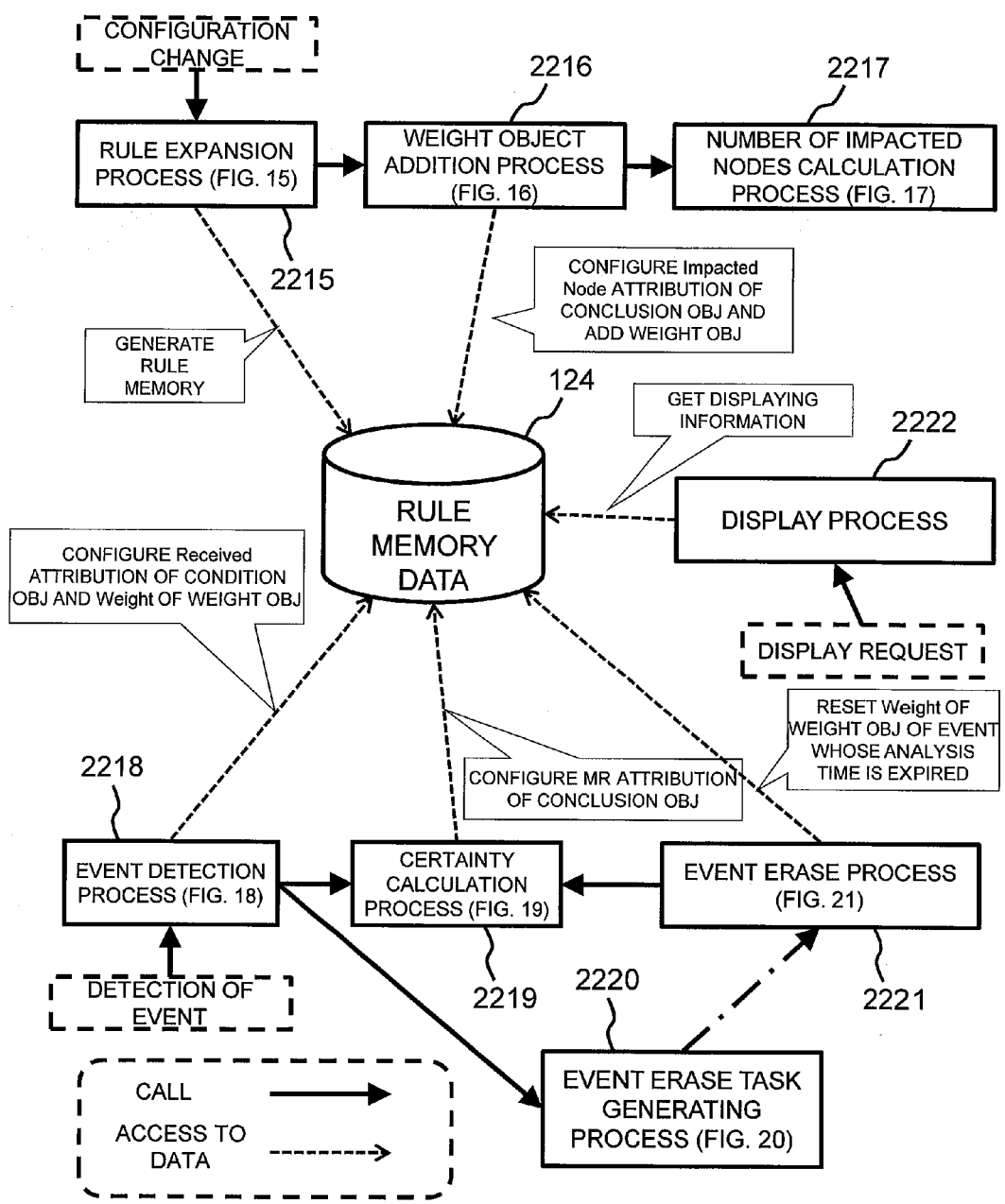
[FIG. 22]

FIG. 22 is a drawing showing the relationship between processes executed by the management computer.

The management computer 100 executes the rule expansion process 2215 (FIG. 15) with a momentum of a change of the system configuration of the information processing system, for example. By the rule expansion process 2215, an intermediate rule memory data 124 which does not include the weight object 1003 is generated.

Moreover, the management computer 100 executes the weight object addition process 2216 (FIG. 16) in the rule expansion process 2215. By the weight object addition process 2216, the final rule memory data 124 including the weight object 1003 is generated.

In addition, the management computer 100 executes the number of impacted nodes calculation process 2217 (FIG. 17) in the weight object addition process 2216. By the number of impacted nodes calculation process 2217, the number of impacted nodes configured in each conclusion object 1004 in the rule memory data 124 is calculated.

Further, the management computer 100 executes the event detection process 2218 (FIG. 18) with a momentum of the detection of the event. By the event detection process 2218, the event entry 1250 related to the detection event is prepared, and the weight related to the detection event is configured as valid.

Further, the management computer 100 executes the certainty calculation process 2219 (FIG. 19) and the event erase task generating process 2220 (FIG. 20) in the event detection process 2218. By the certainty calculation process 2219, the certainty of each conclusion associated with the condition showing the detection event is calculated. Moreover, by the event erase task generating process 2220, the event erase task for resetting the weight related to the detection event is generated.

Further, the management computer 100 executes the event erase process 2221 (FIG. 21). By the event erase process, the weight related to the event in which the analysis time width has elapsed from its detection is configured as invalid. After that, the management computer 100 executes the certainty calculation process 2219 (FIG. 19) to re-calculate the certainty of each conclusion associated with the condition related to the weight configured as invalid.

Further, the management computer 100 executes the display process 2222 with a momentum of receiving a display request from the administrator or the like. In the display process 2222, the management computer 100 determines the cause candidate based on the certainty managed by each conclusion object 1004 in the rule memory data 124. For example, the management computer 100 may determine the cause candidate whose certainty is a predetermined number or more, or a predetermined number of cause candidates with higher certainty. Moreover, the management computer 100 displays the result information of a cause analysis showing the cause candidate (the first and second analysis result display screens, etc.) on the display 206 coupled to the display computer 200.

FIG. 23 is a drawing showing an example of the first analysis result display screen.

A plurality of cause candidates 2300 are displayed on the first analysis result display screen. In this figure, ten cause candidates #1 to #10 are displayed. Moreover, on the first analysis result display screen, for each cause candidate 2300, the number of impacted nodes 2301 of the cause candidate 2300, certainty 2302 of the cause candidate 2300, and an analysis time width 2303 of the cause candidate 2300 are displayed.

The cause candidates 2300 can be displayed with sorting by any of the number of impacted nodes 2301 and the certainty 2302. In the example of this figure, the cause candidates 2300 are, after they are sorted by the certainty 2302 in descending order, further sorted by the number of impacted nodes 2301 in descending order. More specifically, the cause candidates 2300 are displayed with arrangement from the top to the bottom of the screen in descending order of the certainty 2302 and, regarding the cause candidates having the same certainty 2302, in descending order of the number of impacted nodes 2301.

In this way, by configuring such that the cause candidates 2300 can be displayed with sorting by any of the number of impacted nodes 2301 and the certainty 2302, the cause candidate 2300 whose affected range is large or the cause candidate 2300 whose certainty is high can be focused. For example, the cause candidates 2300 can be sorted by the number of impacted nodes 2301 in descending order, and further sorted by the number of impacted nodes 2301 in descending order. Consequently, the administrator does not fail to find the important cause candidate 2300 which should be originally noted even though its certainty 2300 is not so high (for example, the cause candidate 2300 whose affected range is large).

Additionally, in order to switch the sort column, the management computer 100 can transmit the information including the information related to the top ten cause candidates 2300 sorted by the number of the impacted nodes 2301 and the information related to the top ten cause candidate 2300 sorted by the number of the certainty 2302 to the displaying result display program 211 of the display computer 200.

FIG. 24 is a drawing showing an example of the second analysis result display screen.

The second analysis result display screen is a screen representing the correspondence relationship between the certainty 2302 and the analysis time width 2303 regarding one cause candidate 2300. For example, in the first analysis result display screen, when the desired cause candidate 2300 is specified, the second analysis result display screen related to the specified cause candidate 2300 (hereinafter, it is referred to as "specified cause candidate") is displayed.

In this figure, the correspondence relationship between the certainty 2302 and the analysis time width 2303 is displayed as a graph. The X-axis (abscissa) 2402 is the time axis. The right end of the X-axis 2402 shows the current time (now), and it goes back as it approaches the left end. The Y-axis (ordinate) 2401 represents the certainty 2302 of the specified cause candidate 2300. A plot 2440 (2440a, 2440b, etc.) shows the detected event among the events shown by the condition associated with the specified cause candidate 2300, that is, the events which occur affected by a cause when the specified cause candidate is the cause. The X coordinate of the plot 2440 shows the time when the event is detected. The Y coordinate of the plot 2440 shows the certainty 2302 of the specified cause candidate 2300 when the detection of the event is valid. In this figure, regarding the specified cause candidate 2300, five events (the events respectively shown by the plot 2440a, 2440b, 2440c, 2440d and 2440e) are detected, and it is shown that the certainty 2302 becomes 100% when the detection of all these events are valid. Additionally, from this point, it is found that the events which occur affected by a cause when the specified cause candidate is the cause are five (the events respectively shown by the plot 2440a, plot 2440b, plot 2440c, plot 2440d and plot 2440e).

The horizontal width of a rectangular region 2410 enclosed by a dashed like corresponds to the time width 2420, and this time width 2420 shows the analysis time width 2303 of the specified cause candidate which is currently applied. That is, the rectangular region 2410 shows that, currently, the detection of the event in this region (the events shown by the plot 2440c, plot 2440d and plot 2440e) is valid and the detection of the event outside this region (the events shown by the plot 2440a and 2440b) is invalid. In addition, the Y coordinate of an intersection 2430 between a line 2460 connecting each plot 2440 and the rectangular region 2410 shows the current certainty 2302 of the specified cause candidate 2300. In this figure, three events (the events shown by the plot 2440c, 2440d and 2440e) of the five events are valid, so that the current certainty 2302 of the specified cause candidate 2300 is 60(=3/5×100) %. The administrator can find that, with reference to this graph, if the analysis time width 2303 is further extended by the time width 2450, the certainty 2302 of the specified cause candidate 2300 becomes 100%.

In this way, by displaying the correspondence relationship between the certainty 2302 and the analysis time width 2303, the administrator can find how the certainty 2302 changes when the analysis time width 2303 is changed. For example, the administrator can judge that it is highly possible that the specified cause candidate 2300 is a cause if the certainty 2302 becomes 100% by making the analysis time width 2303 a little larger. On the contrary, the administrator can judge that it is unlikely that the specified cause candidate 2300 is a cause if the certainty 2302 does not approach 100% even though the analysis time width 2303 is made larger.

Moreover, the line 2460 is prepared by drawing a line in a staircase pattern to connect the detected events, among the events which occur affected by a cause when the specified cause candidate 2300 is the cause, stacked from the bottom in order beginning with the detected event whose detection time is the chronologically newest. In this embodiment, the width of the staircase of all the events is equal; however, for example, the width of the staircase may be changed for each event in accordance with the influence rate of the event. Also, the line 2460 may be prepared such that, for example, the certainty 2302 is gradually changed in accordance with the change of the weight value in a case where the degree of validity of the event detection is considered in the weight related to the event. Moreover, as the correspondence relationship between the certainty 2302 and the analysis time width 2303, the certainty may be calculated based on the event detected from a certain point on the X-axis representing the past time to a predetermined reference point (different from the current time) and the value of the certainty may be displayed.

According to the above, the following is explained. That is, a monitoring program executed by a computer comprising a monitoring system configured to perform a cause analysis of an event which occurs in any of a plurality of monitoring-target objects using a rule and having a storage device, the rule including a necessary condition for determining a predetermined conclusion as a cause, and the monitoring program is configured to execute the following:

performing a cause analysis of an event which occurs in the monitoring-target object based on the rule to determine a plurality of conclusions having a possibility of being a cause; and sorting and displaying the plurality of determined conclusions in accordance with an index value showing an affected range when the conclusion is the cause. Additionally, in this case, the weight object or the operator object may be omitted.

Additionally, the following is explained. That is, the rule is configured to include a general rule showing association between one or more first conditions showing an event by a combination of the type of the event and the type of a monitoring-target object which is a source of occurrence of the event and the first conclusion which is a cause when the one or more first conditions are satisfied, the storage device is configured to further store relationship information showing existence or non-existence of data communication between the plurality of monitoring-target objects, and the monitoring program may execute the following:

generating expansion information including a plurality of associations between one or more second conditions showing an event by a combination between the type of the event and information specifying a monitoring-target object which is a source of occurrence of the event and the second conclusion which is a cause when the one or more second conditions are satisfied based on the general rule and the relationship information;

determining, regarding each second conclusion of the expansion information, the index value of the second conclusion based on one or more associated second conditions;

determining a plurality of second conclusions having a possibility of being a cause in the cause analysis; and sorting and displaying the plurality of determined second conclusions in accordance with the index value of each second conclusion.

Additionally, the following is explained. That is, the storage device further stores, for each second condition of the expansion information, detection data showing validity or invalidity of detection of an event shown by the second condition, and the monitoring program may execute the following:

configuring, when an event is detected, the detection data of a detection event which is the detected event as valid;

determining an analysis time width of the detection event based on the index value of the second conclusion associated with the second condition of the expansion information showing the detection event;

configuring the detection data of the detection event as invalid when the determined analysis time width has elapsed from the time when the detection event is detected; and determining, in the cause analysis, regarding each second conclusion of the expansion information, certainty showing probability that the second conclusion is a cause based on the detection data of each event shown by one or more associated second conditions and determining a plurality of second conclusions having possibility of being a cause based on the determined certainty.

Additionally, the following is explained. That is, the monitoring program may display, for each second conclusion determined in the cause analysis, information representing a correspondence relationship between certainty of the second conclusion and the analysis time width.

Additionally, the following is explained. That is, the monitoring program may specify certainty after a change when it is assumed that the analysis time width is changed and displaying the certainty after the change.

Also, the following is explained. That is, a validity period of a certain event may exist for each index value.

Additionally, the following is explained. That is, the storage device stores, regarding each second condition of the expansion information, the detection data for each of the index values of one or more associated second conclusions, and the monitoring program may execute the following:

determining the analysis time width of the detection event for the different index values when there exist a plurality of second conclusions whose index values are different in the second conclusion associated with the second condition of the expansion information showing the detection event, and configuring, when any of the plurality of determined analysis time widths has elapsed from the time when the detection event is detected, the detection data of the detection event related to the index value corresponding to the elapsed analysis time width as invalid; and calculating, in the cause analysis, regarding each second conclusion of the expansion information, based on the detection data related to the index value of the second conclusion of each event shown by one or more associated second conditions, certainty of the second conclusion.

Additionally, the following is explained. That is, the monitoring program may generate, as the expansion information, rule memory data having a plurality of condition objects configured to manage the event shown by the second condition, a plurality of conclusion objects corresponding to the second conclusion and configured to manage the index value and certainty of the second conclusion, and a plurality of weight objects coupled to the condition objects and the conclusion objects and configured to manage the detection data related to the index value managed by the coupled conclusion object of the event managed by the coupled condition object.

Additionally, the following is explained. That is, the storage device stores analysis time width information showing a correspondence relationship between the weight object whose detection data is configured as valid and the analysis time width determined related to the index value managed by the conclusion object coupled to the weight object of the event managed by the condition object coupled to the weight object, and the monitoring program may configure, after the event managed by the condition object coupled to the weight object included in the analysis time width information is detected, when the analysis time width corresponding to the weight object has elapsed, the detection data managed by the weight object as invalid.

Additionally, the following is explained. That is, the monitoring program may calculate, regarding each second conclusion of the expansion information, the number of monitoring-target apparatuses of a monitoring-target object which is a source of occurrence of the event shown by one or more second conditions corresponding to the second conclusion and use the calculated number as the index value of the second conclusion.

Moreover, in another aspect, the monitoring system stores a rule (including the necessary condition for determining a predetermined conclusion as a cause), and based on this rule, performs a cause analysis of an event which occurs in the monitoring-target object. Additionally, as the cause analysis, the monitoring system calculates certainty applied to the condition and defined by the detected event in a predetermined analysis time width. Incidentally, the analysis time width is calculated based on the index value showing the affected range when the conclusion is a cause. Such process may be performed independently of the sorting based on the index value, or may be performed in combination therewith.

Moreover, in another aspect, the monitoring system stores a rule (including the necessary condition for determining a predetermined conclusion as a cause), and based on this rule, performs a cause analysis of an event which occurs in the monitoring-target object. Additionally, as the cause analysis, the monitoring system calculates certainty applied to the condition and defined by the detected event in a predetermined analysis time width. Moreover, the monitoring system specifies certainty after a change when it is assumed that the analysis time width is changed and displays the certainty after the change. Incidentally, such process may be performed independently of the sorting based on the index value or the determination of the analysis time width based on the index value, or may be performed in combination therewith.

Additionally, it is needless to say that the present invention is not limited to this embodiment and can be variously modified within the range not departing from its gist.

For example, it is acceptable that each weight object 1003 manages, instead of managing the second detection data, the analysis time width related to the number of impacted nodes related to the second detection data of the event related to the second detection data, and in analysis, the management computer 100 judges existence or non-existence of event detection based on the analysis time width managed by the weight object 1003 and the first detection data (especially, the detection time of the event) managed by the condition object 1001 (for example, the event detection is judged as valid if the time from the detection time of the event to the time after the analysis time width has elapsed is at or after the current time) and calculates certainty based on the validity or invalidity of the detection.

REFERENCE SIGNS LIST

100: management computer
200: display computer
300: communication network
400: server
500: storage

The invention claimed is:

1. A non-transitory computer readable medium storing a program causing a computer to execute a monitoring process, the monitoring process is configured to perform a cause analysis of an event which occurs in any of a plurality of monitoring-target objects using a rule and having a storage device, the monitoring process comprising:
  performing a cause analysis of an event which occurs in the monitoring-target object based on the rule to determine a plurality of conclusions having a possibility of being a cause;
  sorting the plurality of determined conclusions in accordance with an index value indicating a range of other monitoring-target objects affected by the event, when a conclusion of the plurality of determined conclusions is the cause; and
  displaying the sorted plurality of determined conclusions,
  wherein, the rule includes a necessary condition for determining a predetermined conclusion as a cause.

2. A non-transitory computer readable medium storing a program causing a computer to execute a monitoring process according to claim 1,
  wherein the rule is configured to include a general rule showing association between one or more first conditions showing an event by a combination of the type of the event and the type of a monitoring-target object which is a source of occurrence of the event and the first conclusion which is a cause when the one or more first conditions are satisfied,
  wherein the storage device is configured to further store relationship information showing existence or non-existence of data communication between the plurality of monitoring-target objects,
  and wherein the monitoring process further comprises:
  generating expansion information including a plurality of associations between one or more second conditions showing an event by a combination between the type of the event and information specifying a monitoring-target object which is a source of occurrence of the event and the second conclusion which is a cause when the one or more second conditions are satisfied based on the general rule and the relationship information;
  determining, regarding each second conclusion of the expansion information, an index value of the second conclusion based on one or more associated second conditions;
  determining a plurality of second conclusions having a possibility of being a cause in the cause analysis;
  sorting the plurality of determined second conclusions in accordance with the index value of each second conclusion; and
  displaying the sorted plurality of determined second conclusions.

3. A non-transitory computer readable medium storing a program causing a computer to execute a monitoring process according to claim 2, wherein the storage device further stores, for each second condition of the expansion information, detection data showing validity or invalidity of detection of an event shown by the second condition, and wherein the monitoring process further comprises:

configuring, when an event is detected, the detection data of a detection event which is the detected event as valid;

determining an analysis time width of the detection event based on the index value of the second conclusion associated with the second condition of the expansion information showing the detection event;

configuring the detection data of the detection event as invalid when the determined analysis time width has elapsed from the time when the detection event is detected; and determining, in the cause analysis, regarding each second conclusion of the expansion information, certainty showing probability that the second conclusion is a cause based on the detection data of each event shown by one or more associated second conditions and determining a plurality of second conclusions having possibility of being a cause based on the determined certainty.

4. A non-transitory computer readable medium storing a program causing a computer to execute a monitoring process according to claim 3, wherein the monitoring process further comprises displaying, for each second conclusion determined in the cause analysis, information representing a correspondence relationship between certainty of the second conclusion and the analysis time width.

5. A non-transitory computer readable medium storing a program causing a computer to execute a monitoring process according to claim 4, wherein the monitoring process further comprises specifying certainty after a change when it is assumed that the analysis time width is changed and displaying the certainty after the change.

6. A non-transitory computer readable medium storing a program causing a computer to execute a monitoring process according to claim 5, wherein a validity period of a certain event exists for each index value.

7. A non-transitory computer readable medium storing a program causing a computer to execute a monitoring process according to claim 6, wherein the storage device stores, regarding each second condition of the expansion information, the detection data for each of the index values of one or more associated second conclusions, and wherein the monitoring process further comprises:

determining the analysis time width of the detection event for the different index values when there exist a plurality of second conclusions whose index values are different in the second conclusion associated with the second condition of the expansion information showing the detection event, and configuring, when any of the plurality of determined analysis time widths has elapsed from the time when the detection event is detected, the detection data of the detection event related to the index value corresponding to the elapsed analysis time width as invalid; and calculating, in the cause analysis, regarding each second conclusion of the expansion information, based on the detection data related to the index value of the second conclusion of each event shown by one or more associated second conditions, certainty of the second conclusion.

8. A non-transitory computer readable medium storing a program causing a computer to execute a monitoring process according to claim 7, wherein the monitoring process further comprises generating, as the expansion information, rule memory data having a plurality of condition objects configured to manage the event shown by the second condition, a plurality of conclusion objects corresponding to the second conclusion and configured to manage the index value and certainty of the second conclusion, and a plurality of weight objects coupled to the condition objects and the conclusion objects and configured to manage the detection data related to the index value managed by the coupled conclusion object of the event managed by the coupled condition object.

9. A non-transitory computer readable medium storing a program causing a computer to execute a monitoring process according to claim 8, wherein the storage device stores analysis time width information showing a correspondence relationship between the weight object whose detection data is configured as valid and the analysis time width determined related to the index value managed by the conclusion object coupled to the weight object of the event managed by the condition object coupled to the weight object, and wherein the monitoring process further comprises configuring, after the event managed by the condition object coupled to the weight object included in the analysis time width information is detected, when the analysis time width corresponding to the weight object has elapsed, the detection data managed by the weight object as invalid.

10. A non-transitory computer readable medium storing a program causing a computer to execute a monitoring process according to claim 9, wherein the monitoring process comprises calculating, regarding each second conclusion of the expansion information, the number of monitoring-target apparatuses of a monitoring-target object which is a source of occurrence of the event shown by one or more second conditions corresponding to the second conclusion and using the calculated number as the index value of the second conclusion.

11. A monitoring system configured to perform a cause analysis of an event which occurs in any of a plurality of monitoring-target objects using a rule, the monitoring system comprising:

a storage device configured to store the rule; and a control device coupled to the storage device, wherein the rule includes a necessary condition for determining a predetermined conclusion as a cause, and wherein the control device is configured to perform the following:

performing a cause analysis of the event which occurs in the monitoring-target object and determining a plurality of conclusions having possibility of being a cause;

sorting the plurality of determined conclusions in accordance with an index value which is a value determined by the rule about each conclusion and indicates a range of other monitoring-target objects affected by the event, when a conclusion of the plurality of determined conclusions is the cause; and displaying the sorted plurality of determined conclusions.

12. A monitoring system according to claim 11, wherein the rule is configured to include a general rule showing association between one or more first conditions showing an event by a combination of the type of the event and the type of the monitoring-target object which is a source of occurrence of the event and the first conclusion which is a cause when the one or more conditions are satisfied,
- wherein the storage device is configured to further store relationship information showing existence and non-existence of data communication between the plurality of monitoring-target objects, and
- wherein the control device is configured to perform the following:
- generating expansion information including a plurality of associations between one or more second conditions showing an event by a combination between the type of the event and information specifying a monitoring-target object which is a source of occurrence of the event and the second conclusion which is a cause when the one or more second conditions are satisfied based on the general rule and the relationship information;
- determining, regarding each second conclusion of the expansion information, an index value of the second conclusion based on one or more associated second conditions;
- determining a plurality of second conclusions having a possibility of being a cause in the cause analysis;
- sorting the plurality of determined second conclusions in accordance with the index value of each second conclusion;
- and displaying the sorted plurality of determined second conclusions.

13. A monitoring system according to claim 12,
- wherein the storage device further stores, for each second condition of the expansion information, detection data showing validity or invalidity of detection of an event shown by the second condition, and
- wherein the control device is configured to perform the following:
- configuring, when an event is detected, the detection data of a detection event which is the detected event as valid;
- determining an analysis time width of the detection event based on the index value of the second conclusion associated with the second condition of the expansion information showing the detection event;
- configuring the detection data of the detection event as invalid when the determined time width has elapsed from the time when the detection event is detected; and
- determining, in the cause analysis, regarding each second conclusion of the expansion information, certainty showing probability that the second conclusion is a cause based on the detection data of each event shown by one or more associated second conditions and determining a plurality of second conclusions having possibility of being a cause based on the determined certainty.

14. A monitoring system according to claim 12, wherein the control device is configured to display, for each second conclusion determined in the cause analysis, information representing a correspondence relationship between certainty of the second conclusion and the analysis time width.

15. A monitoring system according to claim 14, wherein the control device is configured to specify certainty after a change when it is assumed that the analysis time width is changed and display the certainty after the change.

* * * * *